United States Patent
Jeong et al.

(10) Patent No.: US 11,755,476 B2
(45) Date of Patent: *Sep. 12, 2023

(54) MEMORY CONTROLLER, STORAGE DEVICE INCLUDING THE MEMORY CONTROLLER, AND METHOD OF OPERATING THE MEMORY CONTROLLER AND THE STORAGE DEVICE

(71) Applicant: SK hynix Inc., Icheon (KR)

(72) Inventors: Gi Jo Jeong, Icheon (KR); Do Hun Kim, Icheon (KR); Kwang Sun Lee, Icheon (KR)

(73) Assignee: SK hynix Inc., Icheon (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/196,691

(22) Filed: Mar. 9, 2021

(65) Prior Publication Data
US 2021/0318957 A1    Oct. 14, 2021

(30) Foreign Application Priority Data

Apr. 13, 2020 (KR) .......... 10-2020-0044768
Jun. 25, 2020 (KR) .......... 10-2020-0077968
Jun. 30, 2020 (KR) .......... 10-2020-0080589

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0656* (2013.01); *G06F 3/0679* (2013.01); *G06F 2212/60* (2013.01)

(58) Field of Classification Search
CPC ............ G06F 12/0802; G06F 12/0848; G06F 3/0604; G06F 3/0656; G06F 3/0679; G06F 3/0659; G06F 3/0688; G06F 3/061; G06F 2212/60; G06F 2212/466
See application file for complete search history.

(56) References Cited

U.S. PATENT DOCUMENTS

| | | | |
|---|---|---|---|
| 6,000,006 A | 12/1999 | Bruce et al. | |
| 6,324,620 B1 * | 11/2001 | Christenson | G06F 3/0644 |
| | | | 711/112 |
| 6,330,556 B1 * | 12/2001 | Chilimbi | G06F 16/2282 |
| 6,658,533 B1 | 12/2003 | Bogin et al. | |

(Continued)

FOREIGN PATENT DOCUMENTS

| | | |
|---|---|---|
| KR | 1020000063081 A | 10/2000 |
| KR | 1020070116792 A | 12/2007 |

(Continued)

OTHER PUBLICATIONS

Non-Final Office Action for related U.S. Application, U.S. Appl. No. 16/997,853, dated Dec. 16, 2021.

(Continued)

*Primary Examiner* — Ramon A. Mercado

(57) ABSTRACT

A memory controller includes a buffer memory configured to store first meta data and second meta data having a different type from the first meta data, and a cache memory including first and second dedicated areas. The first meta data is cached in the first dedicated area and the second meta data is cached in the second dedicated area.

19 Claims, 20 Drawing Sheets

(56) References Cited

U.S. PATENT DOCUMENTS

| | | | | |
|---|---|---|---|---|
| 9,026,737 B1* | 5/2015 | Armangau | | G06F 12/0897 |
| | | | | 711/136 |
| 2009/0300293 A1* | 12/2009 | Mantor | | G06F 12/0848 |
| | | | | 711/141 |
| 2012/0096059 A1* | 4/2012 | Shimizu | | G06F 3/0689 |
| | | | | 707/828 |
| 2012/0096217 A1* | 4/2012 | Son | | G06F 12/0246 |
| | | | | 711/E12.008 |
| 2012/0166723 A1* | 6/2012 | Araki | | G06F 12/0246 |
| | | | | 711/E12.019 |
| 2014/0258628 A1* | 9/2014 | Shivashankaraiah | | |
| | | | | G06F 12/0871 |
| | | | | 711/129 |
| 2015/0089316 A1 | 3/2015 | Zhang et al. | | |
| 2015/0347314 A1 | 12/2015 | Lee | | |
| 2016/0070472 A1 | 3/2016 | Takizawa et al. | | |
| 2016/0179402 A1* | 6/2016 | Iwashiro | | G06F 3/0688 |
| | | | | 711/103 |
| 2016/0328161 A1 | 11/2016 | Huang et al. | | |
| 2017/0242785 A1 | 8/2017 | O'Krafka et al. | | |
| 2019/0340070 A1 | 11/2019 | Lien et al. | | |
| 2019/0354413 A1 | 11/2019 | Bivens et al. | | |
| 2020/0019499 A1 | 1/2020 | Yamahuchi | | |
| 2020/0098420 A1 | 3/2020 | Li et al. | | |
| 2020/0192826 A1 | 6/2020 | Ben-Simon et al. | | |
| 2020/0310984 A1 | 10/2020 | Choi et al. | | |
| 2020/0379898 A1 | 12/2020 | Yang | | |
| 2021/0034249 A1* | 2/2021 | Armangau | | G06F 3/0659 |
| 2021/0224187 A1 | 7/2021 | Um | | |
| 2021/0318963 A1 | 10/2021 | Kim | | |
| 2021/0365207 A1 | 11/2021 | Lee | | |
| 2021/0365372 A1* | 11/2021 | Kim | | G06F 12/0804 |

FOREIGN PATENT DOCUMENTS

| | | |
|---|---|---|
| KR | 101014040 B1 | 2/2011 |
| KR | 1020140055737 A | 5/2014 |
| KR | 20150138713 A | 12/2015 |
| KR | 20180104830 A | 9/2018 |
| KR | 10-1992934 B1 | 6/2019 |
| KR | 102002925 B1 | 7/2019 |
| KR | 20190082584 A | 7/2019 |
| KR | 1020190090635 A | 8/2019 |
| KR | 1020200035311 A | 4/2020 |

OTHER PUBLICATIONS

Office Action dated Sep. 29, 2021 for U.S. Appl. No. 16/991,752.
Office Action dated Sep. 15, 2021 for U.S. Appl. No. 17/067,412.
Office Action dated Oct. 7, 2020 for U.S. Appl. No. 16/111,044.
Notice of allowance dated Feb. 4, 2022 for U.S. Appl. No. 17/067,412.
Final Office Action for related U.S. Appl. No. 16/997,853, dated Apr. 5, 2022.
Non-Final Office Action for related U.S. Appl. No. 17/742,264, dated Feb. 28, 2023.

* cited by examiner

MEMORY CONTROLLER, STORAGE DEVICE INCLUDING THE MEMORY CONTROLLER, AND METHOD OF OPERATING THE MEMORY CONTROLLER AND THE STORAGE DEVICE

CROSS-REFERENCE TO RELATED APPLICATION

The present application claims priority under 35 U.S.C. § 119(a) to Korean patent application number 10-2020-0044768 filed on Apr. 13, 2020, Korean patent application number 10-2020-0077968, filed on Jun. 25, 2020, and Korean patent application number 10-2020-0080589, filed on Jun. 30, 2020. The disclosure of each of foregoing applications is incorporated herein by reference in its entirety.

BACKGROUND

1. Technical Field

Various embodiments of the present disclosure generally relate to an electronic device, and more particularly to a memory controller, a storage device including the memory controller, and a method of operating the memory controller.

2. Related Art

A storage device is a device which stores data under the control of a host device such as a computer or a smartphone. The storage device may include a memory device in which data is stored and a memory controller which controls the memory device. Memory devices are classified into a volatile memory device and a nonvolatile memory device.

The volatile memory device is a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to a memory controller having an improved map caching performance and an improved operation speed, a storage device including the memory controller, and a method of operating the memory controller.

An embodiment of the present disclosure may provide for a memory controller for controlling a memory device. The memory controller may include a buffer memory configured to store first meta data and second meta data having a different type from the first meta data, and a cache memory including first and second dedicated areas. The first meta data is cached in the first dedicated area and the second meta data is cached in the second dedicated area.

An embodiment of the present disclosure may provide for a storage device. The storage device may include a buffer memory configured to store first to N-th meta data, and a cache memory including first to N-th dedicated areas respectively corresponding to areas of the buffer memory in which the first to N-th meta data are stored. A size of the first to N-th dedicated areas is determined according to a number of times each of the first to N-th meta data accessed by requests from a host.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Embodiments relate to a memory controller capable of improving map caching performance and increasing an operation speed of a storage device by effectively using a cache memory and a buffer memory.

In an embodiment, a memory controller may effectively use a cache memory to improve a cache hit by caching mapping information from a buffer memory in the cache memory when a target command in a first queue is transferred to a second queue to be processed by a memory device.

In another embodiment, a memory controller may include a cache memory having dedicated areas for separately storing different types of data.

In still another embodiment, when an ECC engine is used for a buffer memory, the buffer memory may use a data aggregator for aggregating requests to improve memory efficiency.

The disclosure in U.S. patent application Ser. No. 17/067, 412, is incorporated herein by reference in its entirety.

Figure 1:
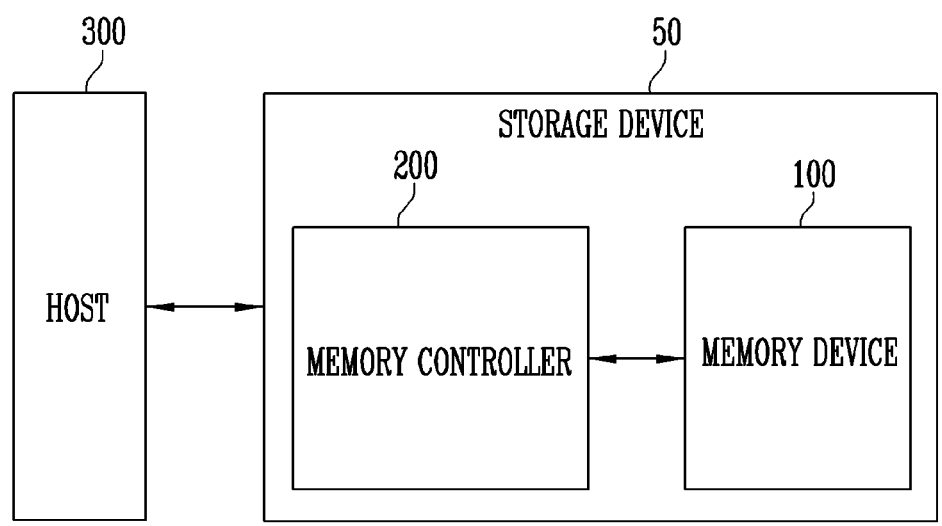
FIG. 1 is a diagram illustrating a storage device according to an embodiment.

FIG. 1 is a diagram illustrating a storage device 50 according to an embodiment of the present disclosure.

Referring to FIG. 1, the storage device 50 may include a memory device 100 and a memory controller 200 which controls an operation of the memory device 100. The storage device 50 may be a device which stores data under the control of a host 300, such as a mobile phone, a smartphone, an MP3 player, a laptop computer, a desktop computer, a game console, a television (TV), a tablet personal computer (PC), an in-vehicle infotainment system, or the like.

The storage device 50 may be manufactured as any one of various types of storage devices depending on a host interface that is a scheme for communication with the host 300. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 may operate under the control of the memory controller 200. The memory device 100 may include a memory cell array including a plurality of memory cells each of which stores one or more bits of data.

Each of the memory cells may be implemented as a single-level cell (SLC) capable of storing one-bit data, a multi-level cell (MLC) capable of storing two-bit data, a triple-level cell (TLC) capable of storing three-bit data, or a quad-level cell (QLC) capable of storing four-bit data.

The memory cell array may include a plurality of memory blocks. Each memory block may include a plurality of memory cells. A single memory block may include a plurality of pages. In an embodiment, a page may be a unit by which data is stored in the memory device 100 or by which data stored in the memory device 100 is read.

A memory block may be a unit by which data is erased. In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change random access memory (PRAM), a magnetoresistive RAM (MRAM), a ferroelectric RAM (FRAM), or a spin transfer torque RAM (STT-RAM). In the present specification, for convenience of description, a description will be made on the assumption that the memory device 100 is a NAND flash memory.

The memory device 100 may receive a request and an address from the memory controller 200, and may access an area of the memory cell array, selected by the address. That is, the memory device 100 may perform an operation indicated by the request on the area selected by the address. For example, the memory device 100 may perform a write operation (i.e., a program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 controls the overall operation of the storage device 50.

When power is applied to the storage device 50, the memory controller 200 may run firmware (FW). When the memory device 100 is a flash memory device, the memory controller 200 may run firmware such as a flash translation layer (FTL) for controlling communication between the host 300 and the memory device 100.

In an embodiment, the memory controller 200 may receive data and a logical block address (LBA) from the host 300, and may translate the logical block address (LBA) into a physical block address (PBA) indicating the address of memory cells which are included in the memory device 100 and in which data is to be stored.

The memory controller 200 may control the memory device 100 so that a program operation, a read operation, or an erase operation is performed in response to a request received from the host 300. During the program operation, the memory controller 200 may provide a write command, a physical block address, and data to the memory device 100. During the read operation, the memory controller 200 may provide a read command and a physical block address to the memory device 100. During the erase operation, the memory controller 200 may provide an erase command and a physical block address to the memory device 100.

In an embodiment, the memory controller 200 may autonomously generate a command, an address, and data regardless of whether a request from the host 300 is received, and may transmit them to the memory device 100. For example, the memory controller 200 may provide commands, addresses, and data to the memory device 100 so as to perform background operations, such as a program operation for wear leveling and a program operation for garbage collection.

In an embodiment, the memory controller 200 may control a plurality of memory devices 100. In this case, the memory controller 200 may control the plurality of memory devices 100 according to an interleaving scheme to improve operation performance. The interleaving scheme may be an operating manner in which operating periods of the plurality of memory devices 100 are caused to overlap each other.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
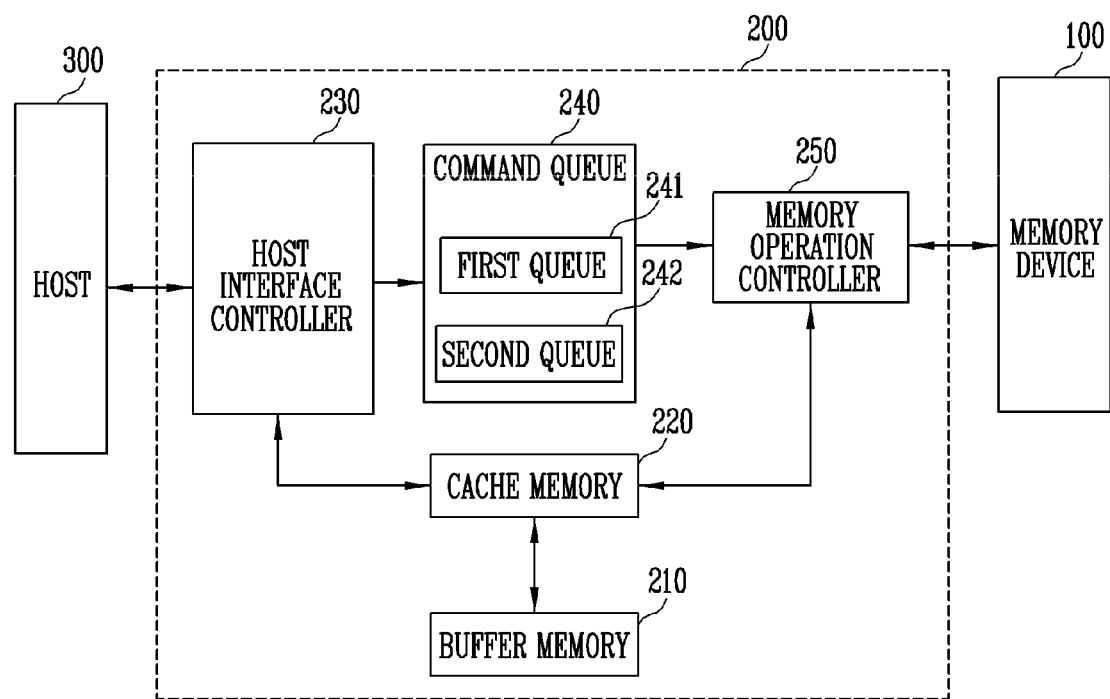
FIG. 2 is a diagram illustrating a configuration and operation of a memory controller of FIG. 1.

FIG. 2 is a diagram illustrating a configuration and an operation of the memory controller 200 of FIG. 1 according to an embodiment.

Referring to FIG. 2, the memory controller 200 may include a buffer memory 210, a cache memory 220, a host interface controller 230, a command queue 240, and a memory operation controller 250.

The command queue 240 may include a first queue 241 and a second queue 242.

The buffer memory 210 may store meta data of the memory device 100, e.g., logical-to-physical address mapping information. The logical-to-physical address mapping information may be information indicating mapping relationships between logical addresses received from the host 300 and physical addresses of the memory device 100 in which data is stored. The logical-to-physical address mapping information may include a plurality of map segments. Each map segment may include a preset number of logical-to-physical address pairs.

The cache memory 220 may store map segments received from the buffer memory 210. The cache memory 220 may be a memory which has capacity less than that of the buffer memory 210, but has an operation speed higher than that of the buffer memory 210.

The host interface controller 230 may receive a request from the host 300. A type of the request may be any one of a write request, a read request, and an erase request. The host interface controller 230 may generate one or more command segments based on the request received from the host 300. In an embodiment, a unit of the command segment may be input/output operations per second (IOPS). For example, 1 IOPS may be a unit by which 4 kB data is processed. An amount of data processed by 1 IOPS is not limited to the present embodiment.

For example, the host interface controller 230 may receive 32 kB write data and a write request from the host 300. A description will be made on the assumption that an amount of data to be programmed in a write operation that is performed depending on one write command segment is 4 kB. In this case, the host interface controller 230 may generate eight write command segments based on the received write request to process the 32 kB write data.

The host interface controller 230 may receive information about a logical address at which data is to be stored, together with the write request, from the host 300. The logical address information received from the host 300 may include one or more logical address segments. The one or more logical address segments may correspond to one or more write command segments, respectively.

In other examples, the host interface controller 230 may receive a read request for 32 kB data stored in the memory device 100 from the host 300. A description will be made on the assumption that an amount of data to be read in a read operation that is performed in response to one read command segment is 4 kB. In this case, the host interface controller 230 may generate eight read command segments based on the received read request.

The host interface controller 230 may receive information about a logical address at which data is stored, together with the read request, from the host 300. The logical address information received from the host 300 may include one or more logical address segments. The one or more logical address segments may correspond to one or more read command segments, respectively.

In an embodiment, the host interface controller 230 may store the generated one or more command segments in the first queue 241. When a target command segment, among the command segments stored in the first queue 241, is transferred to the second queue 242, the host interface controller 230 may cache a target map segment, among map segments of logical-to-physical address mapping information stored in the buffer memory 210, in the cache memory 220. The target map segment may include information about an address at which a memory operation corresponding to the target command segment is to be performed. The memory operation may be a read operation, a program operation, or a write operation.

In an embodiment, the host interface controller 230 may cache a map segment corresponding to a first command segment, among the map segments of the logical-to-physical address mapping information stored in the buffer memory 210, in the cache memory 220. The first command segment may be a command segment corresponding to a first sequential position, that is, a first-ordered command segment, among one or more command segments. A sequence of the one or more command segments may be determined depending on a range of logical address segments corresponding to the command segments.

For example, the host interface controller 230 may receive read requests corresponding to logical addresses LBA1 to LBA100 from the host 300. Assuming that the host interface controller 230 generates first to fourth read command segments based on the read request, a range of a first logical address segment corresponding to the first read command segment may range from LBA1 to LBA25. A range of a second logical address segment corresponding to the second read command segment may range from LBA26 to LBA50. A range of a third logical address segment corresponding to the third read command segment may range from LBA51 to LBA75. A range of a fourth logical address segment corresponding to the fourth read command segment may range from LBA76 to LBA100.

Among the first to fourth read command segments, a first command segment may be the first read command segment for which a range of a logical address segment precedes other logical address segment ranges. A method of determining the first command segment is not limited to the present embodiment.

In an embodiment, the memory operation controller 250 may cache map segments corresponding to the remaining command segments, among the map segments of the logical-to-physical address mapping information stored in the buffer memory 210, in the cache memory 220. The remaining command segments may be the one or more command segments except the first command segment.

The command queue 240 may store the command segments generated by the host interface controller 230, and may provide the stored command segments to the memory operation controller 250.

The first queue 241 may be a pending queue (Pending Q). The first queue 241 may store the one or more command segments generated by the host interface controller 230. The first queue 241 may sequentially provide the stored one or more command segments to the second queue 242. The first queue 241 may be a queue which stores command segments that are waiting to be transferred to the second queue 242.

The second queue 242 may be an inter-process communication queue (IPC Q). The second queue 242 may store each command segment received from the first queue 241, and may provide the stored command segment to the memory operation controller 250. The second queue 242 may be a queue which stores command segments to be processed by the memory operation controller 250. When the memory operation controller 250 is ready to process command segments, the second queue 242 may sequentially output the command segments stored therein to the memory operation controller 250 in the order in which the command segments are input to the second queue 242.

In an embodiment, the size of the second queue 242 may be less than or equal to that of the first queue 241.

The memory operation controller 250 may control the memory device 100 so that a memory operation is performed based on the target command segment received from the second queue 242.

The memory operation controller 250 may access the cache memory 220 and then determine whether the target map segment corresponding to the target command segment is cached in the cache memory 220. When the target map segment is cached in the cache memory 220, a cache hit may occur. When the target map segment is not cached in the cache memory 220, a cache miss may occur.

When the cache hit occurs, the memory operation controller 250 may control the memory device 100 so that the memory operation is performed based on the target map segment cached in the cache memory 220 in response to the target command segment received from the second queue 242.

When the cache miss occurs, the memory operation controller 250 may control the memory device 100 so that the memory operation is performed based on the target map segment, among the map segments of the logical-to-physical address mapping information stored in the buffer memory 210, in response to the target command segment received from the second queue 242. When the cache miss occurs, the memory operation controller 250, rather than the host interface controller 230, may cache the target map segment, among the map segments of the logical-to-physical address mapping information stored in the buffer memory 210, in the cache memory 220.

Since the operating speed of the cache memory 220 is higher than that of the buffer memory 210, the memory operation may be processed faster than that in the event of a cache hit.

The memory operation controller 250 may control the memory device 100 so that a device management operation is performed based on management initiation information.

The management initiation information may include at least one of size information of data received from the host 300 and timer information initialized whenever the device management operation is performed.

The device management operation may include at least one of a block erase operation of securing a block in which write data is to be stored, a garbage collection operation of securing a free block, and a map update operation of flushing the mapping information stored in the buffer memory into the memory device. An example of the device management operation is not limited to the present embodiment.

The memory operation controller 250 may perform, based on the management initiation information, the device management operation whenever an amount of data received from the host 300 reaches a predetermined amount. The memory operation controller 250 may perform the device management operation based on the management initiation information, and may perform the device management operation whenever a predetermined period of time has elapsed.

The memory operation controller 250 may be ready to process command segments when a device management operation is not performed. The memory operation controller 250 may control the memory device 100 so that the memory operation is performed in response to the target command segment received from the second queue 242 while a device management operation is not performed.

Figure 3:
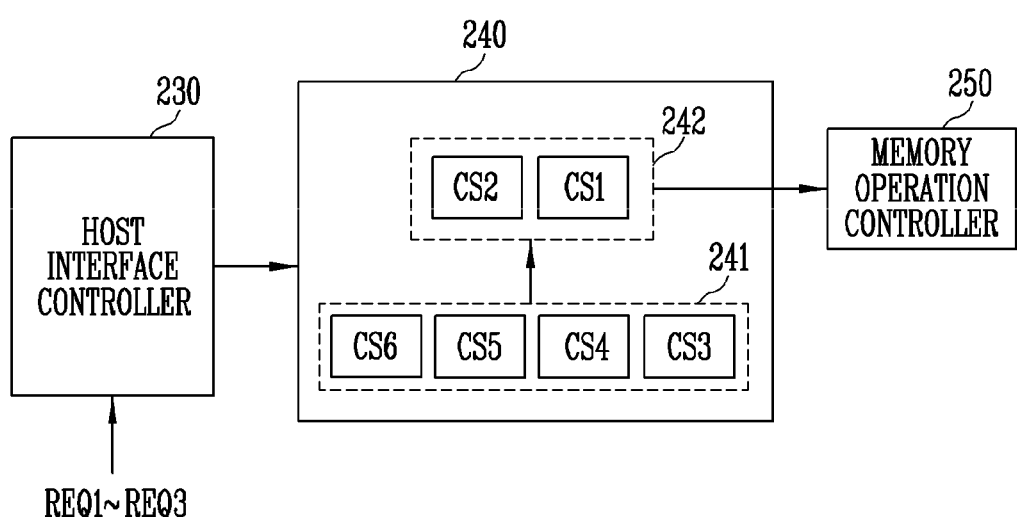
FIG. 3 is a diagram illustrating an operation of a command queue of FIG. 2.

FIG. 3 is a diagram illustrating an operation of the command queue 240 of FIG. 2. The operation of FIG. 3 will be described with reference to FIG. 2.

Referring to FIG. 3, the host interface controller 230 may sequentially receive first to third requests REQ1 to REQ3 from the host 300.

The host interface controller 230 may generate first and second command segments CS1 and CS2 based on the first request REQ1. The host interface controller 230 may generate a third command segment CS3 based on the second request REQ2. The host interface controller 230 may generate fourth to sixth command segments CS4 to CS6 based on the third request REQ3. The number of command segments that are generated based on each request may be determined depending on an amount of data to be processed in response to the corresponding request.

The first queue 241 may store the third to sixth command segments CS3 to CS6. The second queue 242 may store the first and second command segments CS1 and CS2. The first and second command segments CS1 and CS2 may be command segments that are stored in the first queue 241 and then transferred to the second queue 242 after being generated by the host interface controller 230.

The second queue 242 may provide the first and second command segments CS1 and CS2 to the memory operation controller 250. The second queue 242 may provide the first command segment CS1 to the memory operation controller 250 prior to the second command segment CS2 in the order of the command segments input to the second queue 242. When the memory operation controller 250 is ready to process command segments, the second queue 242 may provide the command segments to the memory operation controller 250.

The memory operation controller 250 may control the memory device 100 so that a memory operation is performed based on the command segments received from the second queue 242 while a device management operation is not performed.

Figure 4A:
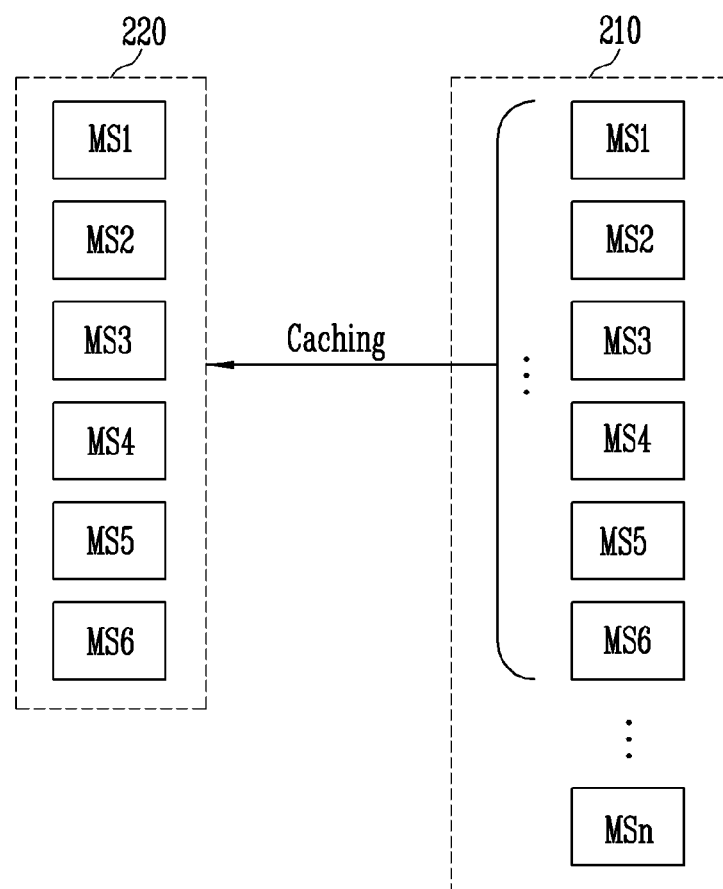
FIG. 4A is a diagram illustrating caching of map segments according to an embodiment.

FIG. 4A is a diagram illustrating caching of map segments according to an embodiment. The caching shown in FIG. 4A will be described with reference to FIG. 2.

Referring to FIG. 4A, the buffer memory 210 may include map segments of logical-to-physical address mapping information of the memory device 100. The logical-to-physical address mapping information may include a plurality of map segments MS1 to MSn (where n is a natural number of 1 or more).

The first to sixth map segments MS1 to MS6, among the map segments of the logical-to-physical address mapping information stored in the buffer memory 210, may be cached in the cache memory 220. The first to sixth map segments MS1 to MS6 may respectively correspond to first to sixth command segments CS1 to CS6, described with reference to FIG. 3.

In other words, the first map segment MS1 may include information about an address at which a memory operation corresponding to the first command segment CS1 is to be performed. The second map segment MS2 may include information about an address at which a memory operation corresponding to the second command segment CS2 is to be performed. Similarly, the sixth map segment MS6 may include information about an address at which a memory operation corresponding to the sixth command segment CS6 is to be performed.

Figure 4B:
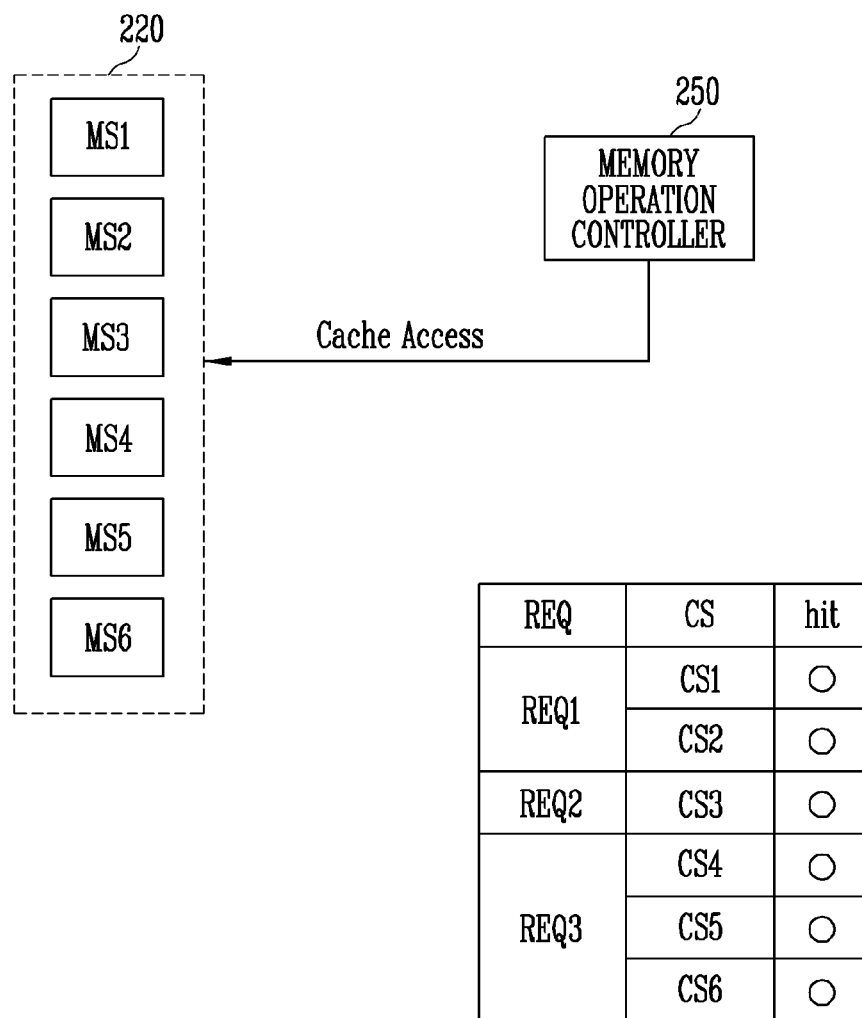
FIG. 4B is a diagram illustrating cache access according to an embodiment.

FIG. 4B is a diagram illustrating cache access according to an embodiment. The cache access shown in FIG. 4B will be described with reference to FIG. 2.

Referring to FIG. 4B, in response to the command segment received from the second queue 242, described above with reference to FIG. 3, the memory operation controller 250 may access the cache memory 220 so as to determine whether a map segment corresponding to the command segment is cached in the cache memory 220.

When it is determined that the map segment corresponding to the command segment is cached in the cache memory 220, a cache hit may occur. When it is determined that the map segment corresponding to the command segment is not cached in the cache memory 220, a cache miss may occur.

In FIG. 4B, since the cache memory 220 caches the first to sixth map segments MS1 to MS6 respectively corresponding to the first to sixth command segments CS1 to CS6, described above with reference to FIG. 3, each of the first to sixth command segments CS1 to CS6 may satisfy a cache hit condition.

Figure 5A:
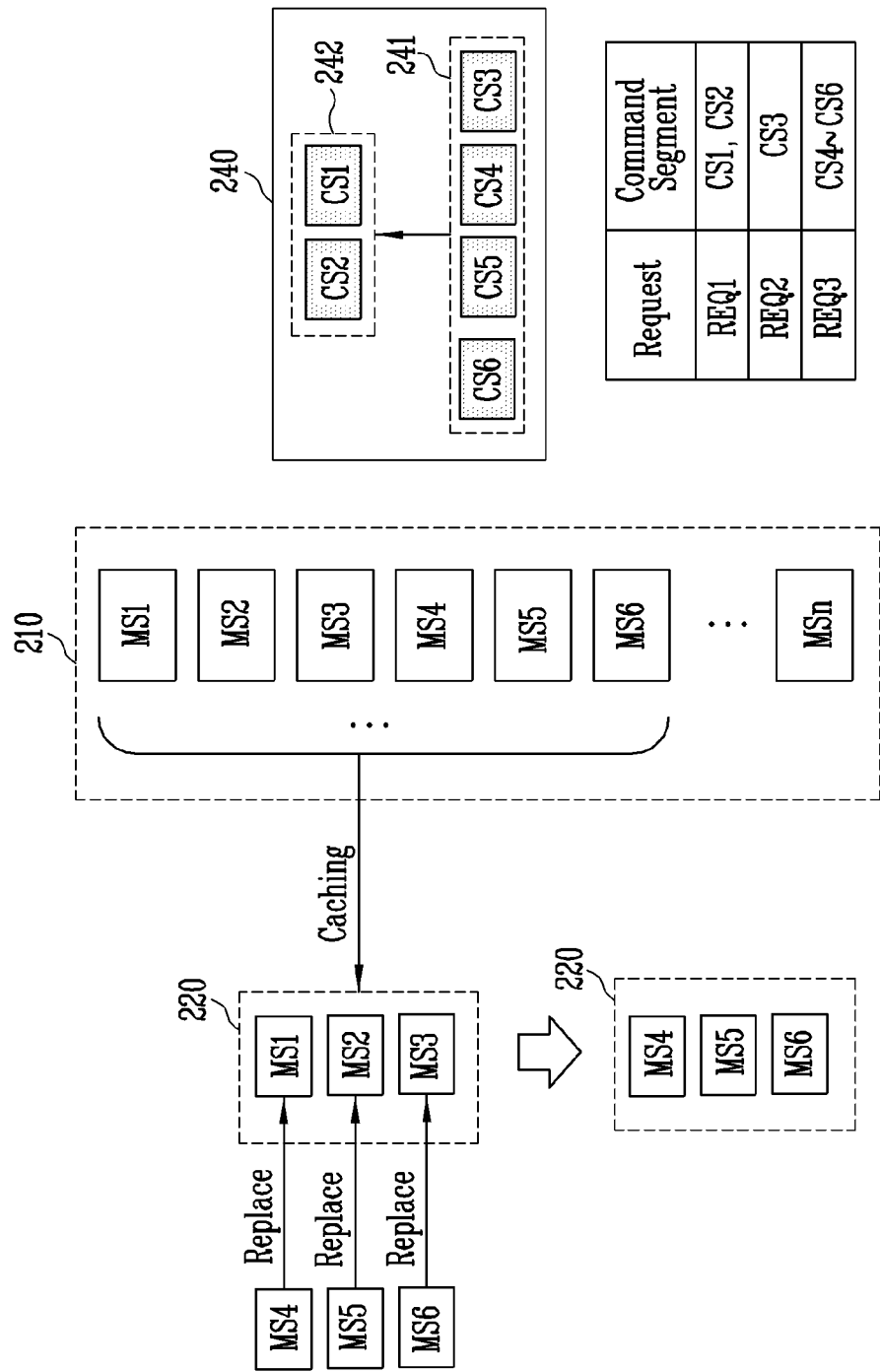
FIG. 5A is a diagram illustrating caching of map segments according to an embodiment.

FIG. 5A is a diagram illustrating caching of map segments according to an embodiment. The caching shown in FIG. 5A will be described with reference to FIG. 2.

Referring to FIG. 5A, the capacity of the cache memory 220 may be more limited than that of the buffer memory 210. In FIG. 5A, a description will be made on the assumption that the maximum number of map segments cacheable in the cache memory 220 is 3. The maximum number of map segments that can be cached in the cache memory 220 is not limited to the present embodiment.

In FIG. 5A, the host interface controller 230, described above with reference to FIG. 3, may be configured to, whenever a command segment is generated, cache the map segment corresponding to the generated command segment, among the map segments of the logical-to-physical address mapping information stored in the buffer memory 210, in the cache memory 220.

Here, the host interface controller 230 may generate first and second commands CS1 and CS2 based on a first request REQ1, and may store the first and second command segments CS1 and CS2 in the first queue 241. When the first and second command segments CS1 and CS2 are generated, the host interface controller 230 may cache first and second map segments MS1 and MS2 corresponding to the first and second command segments CS1 and CS2, among the pieces of mapping information stored in the buffer memory 210, in the cache memory 220.

The first and second command segments CS1 and CS2, stored in the first queue 241, may be transferred to the second queue 242.

The host interface controller 230 may generate a third command segment CS3 based on a second request REQ2, and may store the generated third command segment CS3 in the first queue 241. When the third command segment CS3 is generated, the host interface controller 230 may cache a third map segment MS3 corresponding to the third command segment CS3, among the pieces of mapping information stored in the buffer memory 210, in the cache memory 220.

The host interface controller 230 may generate fourth to sixth command segments CS4 to CS6 in response to a third request REQ3, and may store the generated fourth to sixth command segments CS4 to CS6 in the first queue 241. When the fourth to sixth command segments CS4 to CS6 are generated, the host interface controller 230 may cache fourth to sixth map segments MS4 to MS6 corresponding to the fourth to sixth command segments CS4 to CS6, among the map segments of the logical-to-physical address mapping information stored in the buffer memory 210, in the cache memory 220.

Since the maximum number of map segments cacheable in the cache memory 220 is 3, the first to third map segments MS1 to MS3 which have been previously cached may be replaced by the fourth to sixth map segments MS4 to MS6.

Figure 5B:
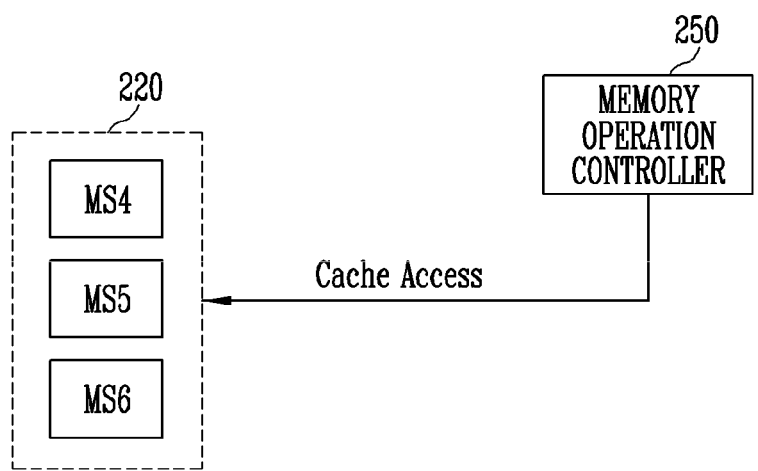
FIG. 5B is a diagram illustrating cache access according to an embodiment.

FIG. 5B is a diagram illustrating cache access according to an embodiment. The cache access shown in FIG. 5B will be described with reference to FIG. 2.

Referring to FIG. 5B, the first to third map segments MS1 to MS3 are not cached in the cache memory 220 any longer, and thus the first to third command segments CS1 to CS3, described above with reference to FIG. 5A, may be processed in a cache miss condition.

Since the fourth to sixth map segments MS4 to MS6 are cached in the cache memory 220, the fourth to sixth command segments CS4 to CS6, described above with reference to FIG. 5A, may be processed in a cache hit condition.

However, since a new command segment is generated at the time at which the fourth to sixth command segments CS4 to CS6 are to be processed, the fourth to sixth command segments CS4 to CS6 may also be processed in a cache miss condition when the fourth to sixth map segments MS4 to MS6 cached in the cache memory 220 are replaced.

Figure 6A:
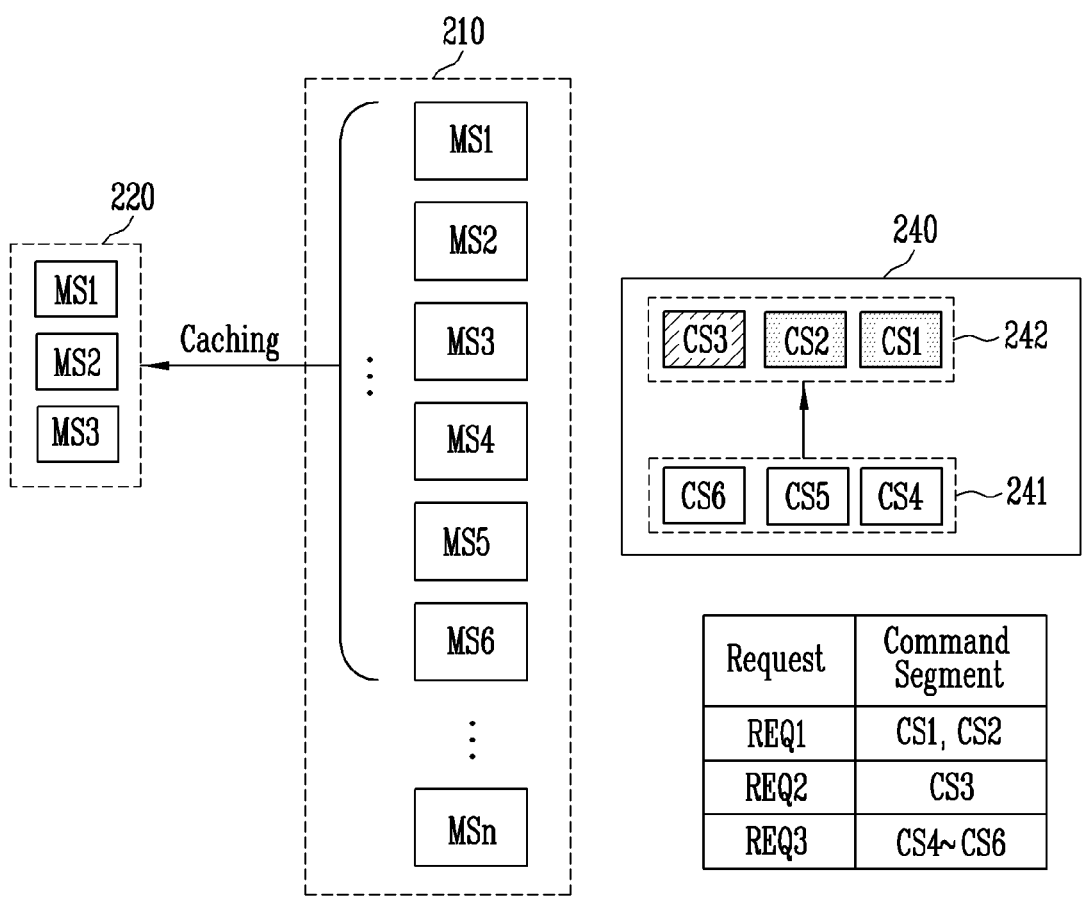
FIG. 6A is a diagram illustrating caching of map segments according to an embodiment.

FIG. 6A is a diagram illustrating caching of map segments according to an embodiment. The caching shown in FIG. 6A will be described with reference to FIG. 2.

Referring to FIG. 6A, the host interface controller 230, described above with reference to FIG. 3, may cache a map segment corresponding to a transferred command segment, among the map segments of the logical-to-physical address mapping information stored in the buffer memory 210, in the cache memory 220 whenever each command segment stored in the first queue 241 is transferred to the second queue 242.

Here, the host interface controller 230 may generate first and second commands CS1 and CS2 based on a first request REQ1, and may store the first and second command segments CS1 and CS2 in the first queue 241.

When the first and second command segments CS1 and CS2 stored in the first queue 241 are transferred to the second queue 242, the host interface controller 230 may cache first and second map segments MS1 and MS2 corresponding to the first and second command segments CS1 and CS2, among the pieces of mapping information stored in the buffer memory 210, in the cache memory 220.

The host interface controller 230 may generate a third command segment CS3 based on a second request REQ2, and may store the generated third command segment CS3 in the first queue 241.

When the third command segment CS3, stored in the first queue 241, is transferred to the second queue 242, the host interface controller 230 may cache a third map segment MS3 corresponding to the third command segment CS3, among the map segments of the logical-to-physical address mapping information stored in the buffer memory 210, in the cache memory 220.

The host interface controller 230 may generate fourth to sixth command segments CS4 to CS6 in response to a third request REQ3, and may store the generated fourth to sixth command segments CS4 to CS6 in the first queue 241.

In FIG. 6A, since the fourth to sixth command segments CS4 to CS6, stored in the first queue 241, are not yet transferred to the second queue 242, fourth to sixth map segments MS4 to MS6 corresponding to the fourth to sixth command segments CS4 to CS6, among the pieces of mapping information stored in the buffer memory 210, may not be cached in the cache memory 220. The fourth to sixth map segments MS4 to MS6 may be cached in the cache memory 220 when the fourth to sixth command segments CS4 to CS6 are subsequently transferred from the first queue 241 to the second queue 242.

Figure 6B:
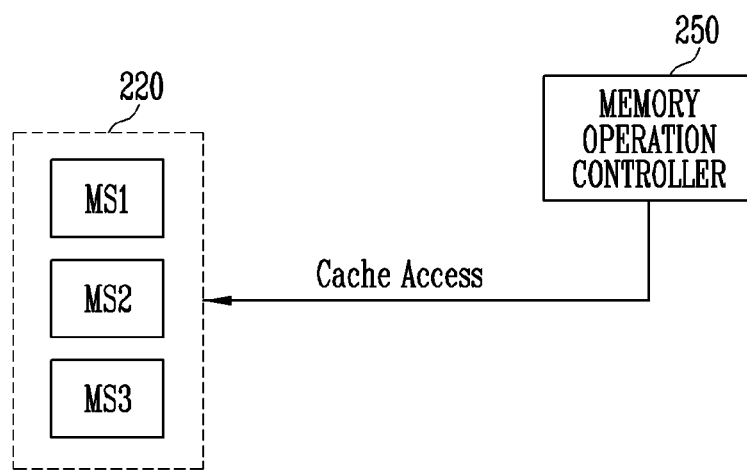
FIG. 6B is a diagram illustrating cache access according to an embodiment.

FIG. 6B is a diagram illustrating cache access according to an embodiment. The cache access shown in FIG. 6B will be described with reference to FIG. 2.

Referring to FIG. 6B, the first to third map segments MS1 to MS3 are cached in the cache memory 220, and thus the first to third command segments CS1 to CS3, described above with reference to FIG. 6A, may be processed in a cache hit condition.

After the first to third command segments CS1 to CS3 have been processed, the fourth to sixth segments CS4 to CS6 may be processed. The fourth to sixth command segments CS4 to CS6 may be processed when being transferred to the memory operation controller 250 via the first queue 241 and the second queue 242. When the fourth to sixth map segments MS4 to MS6 are transferred from the first queue 241 to the second queue 242, fourth to sixth map segments MS4 to MS6 corresponding to the fourth to sixth command segments CS4 to CS6 may be cached in the cache memory 220. Therefore, the fourth to sixth command segments CS4 to CS6 may be processed in a cache hit condition.

That is, when the command segment stored in the first queue 241 is transferred to the second queue 242 rather than when the command segment is generated by the host interface controller 230, a map segment corresponding to the command segment is cached in the cache memory 220, and thus the cache memory 220 having limited capacity may be efficiently utilized, and a cache hit rate for the map segment may be increased.

Figure 7A:
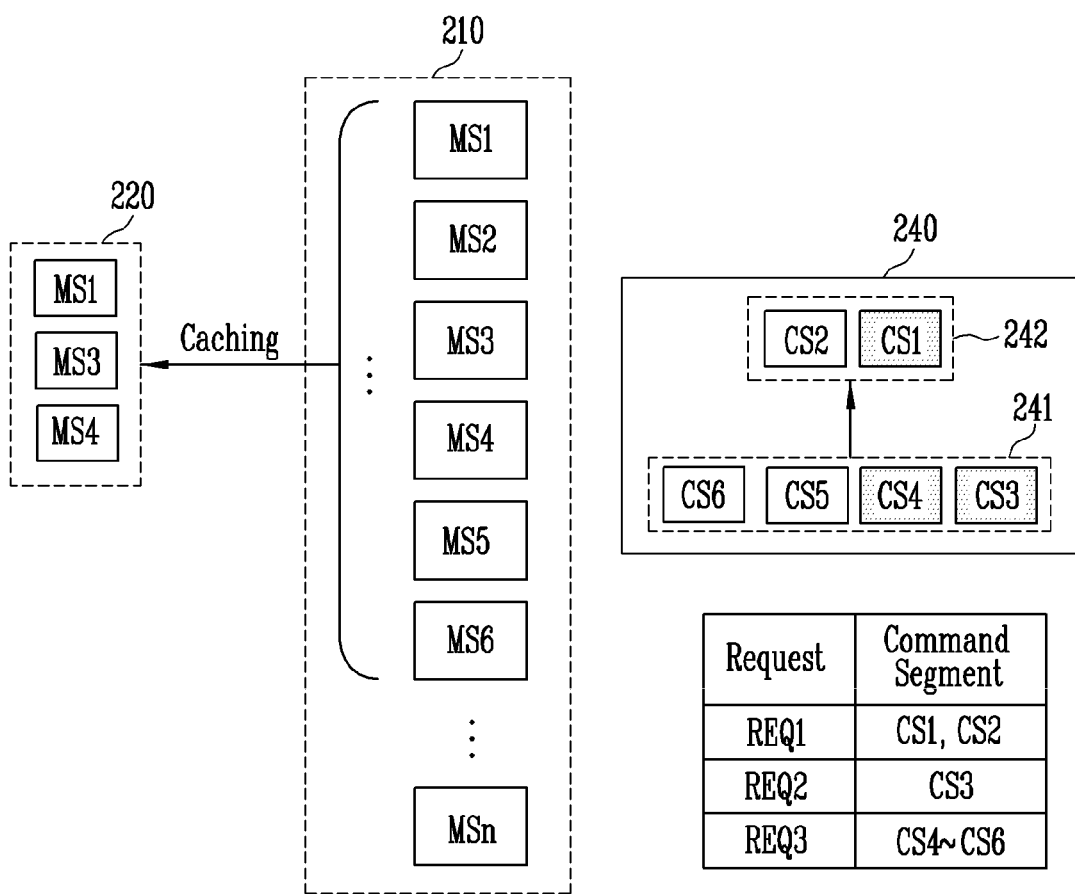
FIG. 7A is a diagram illustrating caching of map segments according to an embodiment.

FIG. 7A is a diagram illustrating caching of map segments according to an embodiment. The caching shown in FIG. 7A will be described with reference to FIG. 2.

Referring to FIG. 7A, the host interface controller 230, described above with reference to FIG. 3, may generate one or more command segments based on a request from the host 300. The host interface controller 230 may cache a map segment corresponding to a first command segment of the one or more command segments, among the map segments of the logical-to-physical address mapping information stored in the buffer memory 210, in the cache memory 220.

The host interface controller 230 may generate first and second command segments CS1 and CS2 based on a first request REQ1. The host interface controller 230 may cache a first map segment MS1 corresponding to the first command segment CS1 that is an initial command segment of the generated first and second command segments CS1 and CS2, among the map segments of the logical-to-physical address mapping information stored in the buffer memory 210, in the cache memory 220.

The host interface controller 230 may generate a third command segment CS3 based on a second request REQ2. The host interface controller 230 may cache a third map segment MS3 corresponding to the generated third command segment CS3, among the map segments of the logical-to-physical address mapping information stored in the buffer memory 210, in the cache memory 220.

The host interface controller 230 may generate fourth to sixth command segments CS4 to CS6 based on a third request REQ3. The host interface controller 230 may cache a fourth map segment MS4 corresponding to the fourth command segment CS4 that is an initial command segment of the generated fourth to sixth command segments CS4 to CS6, among the map segments of the logical-to-physical address mapping information stored in the buffer memory 210, in the cache memory 220.

Figure 7B:
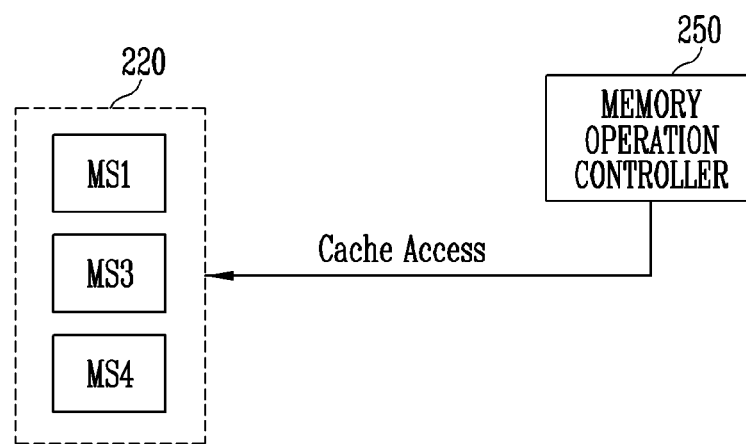
FIG. 7B is a diagram illustrating cache access according to an embodiment.

FIG. 7B is a diagram illustrating cache access according to an embodiment. The cache access shown in FIG. 7B will be described with reference to FIG. 2.

Referring to FIG. 7B, first, third, and fourth map segments MS1, MS3, and MS4 are cached in the cache memory 220, and thus the first, third, and fourth command segments CS1, CS3, and CS4, described above with reference to FIG. 7A, may be processed in a cache hit condition.

Since second, fifth, and sixth map segments MS2, MS5, and MS6 are not cached in the cache memory 220, second, fifth, and sixth command segments CS2, CS5, and CS6, described above with reference to FIG. 7A, may be processed in a cache miss condition.

However, since a logical address at which the memory operation is performed depending on the second command segment CS2 is consecutive to a logical address at which the memory operation is performed depending on the first command segment CS1, the second map segment MS2 may be easily acquired from the mapping information stored in the buffer memory 210 based on information about consecutiveness of logical addresses even in a cache miss condition.

Since logical addresses at which the memory operation is performed depending on the fifth and sixth command segments CS5 and CS6 are consecutive to a logical address at which the memory operation is performed depending on the fourth command segment CS4, the fifth and sixth map segments MS5 and MS6 may be easily acquired from the logical-to-physical address mapping information stored in the buffer memory 210 based on the continuity information of logical addresses even in a cache miss condition.

That is, the host interface controller 230 may generate one or more command segments based on a single request. The host interface controller 230 may cache a map segment corresponding to the first command segment of one or more command segments, rather than all of generated command segments, in the cache memory 220, and thus the cache memory 220 having limited capacity may be efficiently utilized, and a cache hit rate for map segments may be improved.

Figure 8:
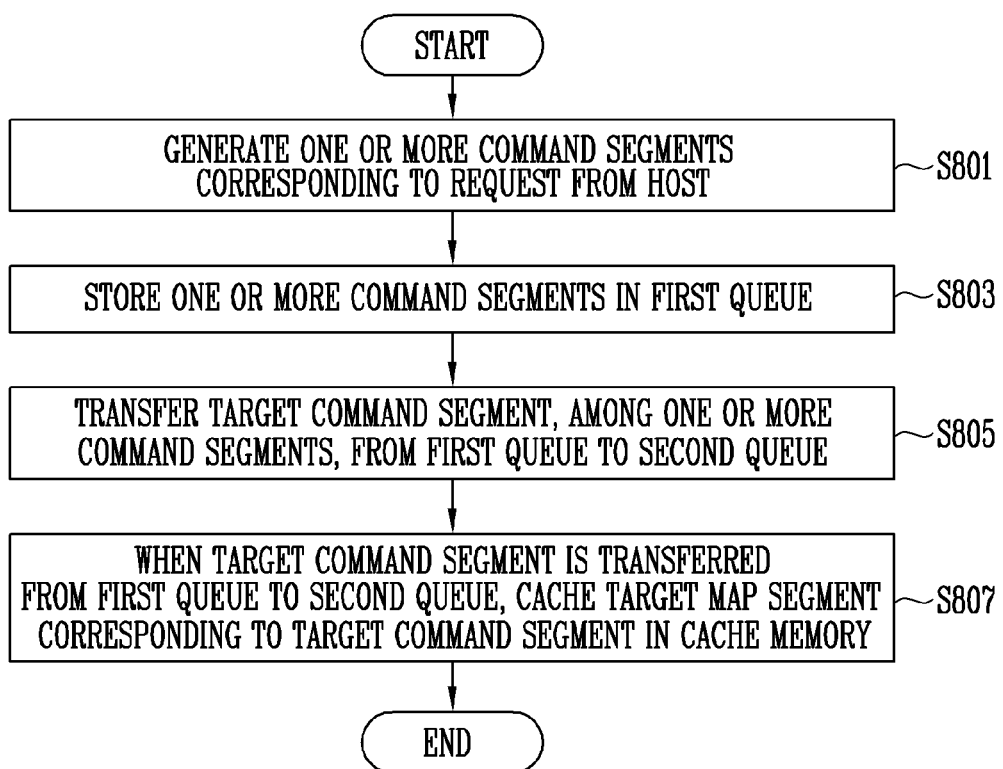
FIG. 8 is a flowchart illustrating a method of operating a memory controller according to an embodiment of the present disclosure.

FIG. 8 is a flowchart illustrating a method of operating a memory controller according to an embodiment of the present disclosure. The method described in FIG. 8 will be described with reference to FIG. 2.

Referring to FIG. 8, at step S801, the memory controller 200 may generate one or more command segments corresponding to a request from the host 300. An amount of data to be processed depending on one command segment may be variously set.

At step S803, the memory controller 200 may store the generated one or more command segments in the first queue 241.

At step S805, the memory controller 200 may transfer a target command segment, among the one or more command segments, from the first queue 241 to the second queue 242. When an available space is present in the second queue 242, the memory controller 200 may transfer the command segments to the second queue 242 in the order in which the command segments are input to the first queue 241.

At step S807, when a target command segment is transferred from the first queue 241 to the second queue 242, the memory controller 200 may cache a target map segment corresponding to the target command segment in the cache memory 220.

Figure 9:
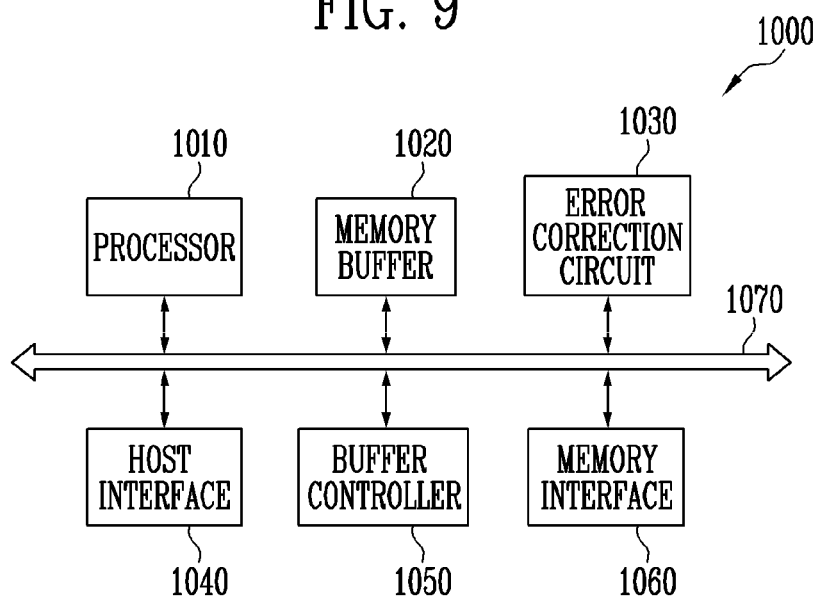
FIG. 9 is a diagram illustrating an embodiment of the memory controller of FIG. 1.

FIG. 9 is a diagram illustrating an embodiment of the memory controller 1000 that may embody the memory controller 200 of FIG. 1.

The memory controller 1000 is coupled to a host and a memory device. In response to a request from the host, the memory controller 1000 may access the memory device. For example, the memory controller 1000 may control read, write, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error correction circuit (ECC) 1030, a host interface 1040, a buffer controller 1050, a memory interface 1060, and a bus 1070.

The bus 1070 may provide a channel between components of the memory controller 1000.

The processor 1010 may control the overall operation of the memory controller 1000 and perform a logical operation. The processor 1010 may communicate with an external host through the host interface 1040 and also communicate with the memory device through the memory interface 1060. Further, the processor 1010 may communicate with the memory buffer 1020 through the buffer controller 1050. The processor 1010 may control the operation of the storage device by using the memory buffer 1020 as a working memory, a cache memory, a buffer memory, or combinations thereof.

The processor 1010 may perform a function of a flash translation layer (FTL). The processor 1010 may translate a logical block address (LBA), provided by the host, into a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor may derandomize the data received from the memory device during a read operation. For example, the processor 1010 may derandomize the data received from the memory device using a derandomizing seed. Derandomized data may be output to the host.

In an embodiment, the processor 1010 may run software or firmware to perform the randomizing or derandomizing operation.

The memory buffer 1020 may be used as a working memory, a cache memory, or a buffer memory of the processor 1010. The memory buffer 1020 may store codes and commands that are executed by the processor 1010. The memory buffer 1020 may store data that is processed by the processor 1010. The memory buffer 1020 may include a static RAM (SRAM) or a dynamic RAM (DRAM).

The error correction circuit 1030 may perform error correction. The error correction circuit 1030 may perform error correction code (ECC) encoding based on data to be written to the memory device through the memory interface 1060. The ECC-encoded data may be transferred to the memory device through the memory interface 1060. The error correction circuit 1030 may perform ECC decoding based on data received from the memory device through the memory interface 1060. In an example, the error correction circuit 1030 may be included as a component of the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Non-Volatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer controller 1050 may control the memory buffer 1020 under the control of the processor 1010.

The memory interface 1060 may communicate with the memory device under the control of the processor 1010. The memory interface 1060 may transmit and receive commands, addresses, and data to and from the memory device through channels.

In an embodiment, the memory controller 1000 may not include the memory buffer 1020 and the buffer controller 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may transmit data in the memory controller 1000, and the control bus may transmit control information, such as commands or addresses, in the memory controller 1000. The data bus and the control bus may be separated from each other, and may neither interfere with each other nor influence each other. The data bus may be coupled to the host interface 1040, the buffer controller 1050, the error correction circuit 1030, and the memory interface 1060. The control bus may be coupled to the host interface 1040, the processor 1010, the buffer controller 1050, the memory buffer 1020, and the memory interface 1060.

In an embodiment, the host interface controller 230 of FIG. 2 may be embodied by the host interface 1040. The buffer memory 210, the cache memory 220, and the command queue 240 of FIG. 2 may be embodied by the memory buffer 1020. The memory operation controller 250 of FIG. 2 may be embodied by the processor 1010.

Figure 10:
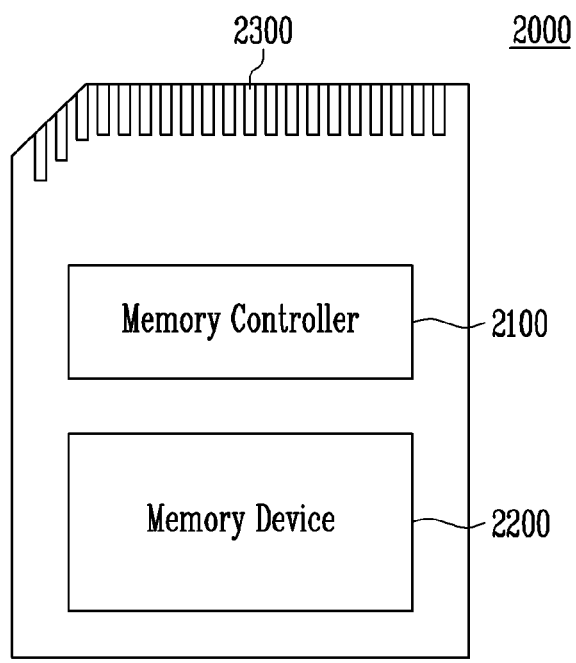
FIG. 10 is a block diagram illustrating a memory card system to which a storage device according to an embodiment of the present disclosure is applied.

FIG. 10 is a block diagram illustrating a memory card system 2000 to which a storage device according to an embodiment of the present disclosure is applied.

The memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same manner as the memory controller 200, described above with reference to FIG. 1.

In an embodiment, the memory controller 2100 may include components, such as a RAM, a processor, a host interface, a memory interface, and an error correction circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various interface protocols such as universal serial bus (USB), multimedia card (MMC), embedded MMC (eMMC), peripheral component interconnection (PCI), PCI-express (PCI-E), an advanced technology attachment (ATA) protocol, a serial-ATA (SATA), parallel-ATA (PATA), small computer small interface (SCSI), enhanced small disk interface (ESDI), integrated drive electronics (IDE), firewire, universal flash storage (UFS), WIFI, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque Magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device and may then form a memory card such as a personal computer memory card international association (PCMCIA), a compact flash (CF) card, a smart media card (SM or SMC), a memory stick, a multimedia card (MMC, RS-MMC, MMCmicro or eMMC), an SD card (SD, mini SD, microSD, or SDHC), a universal flash storage (UFS), or the like.

Figure 11:
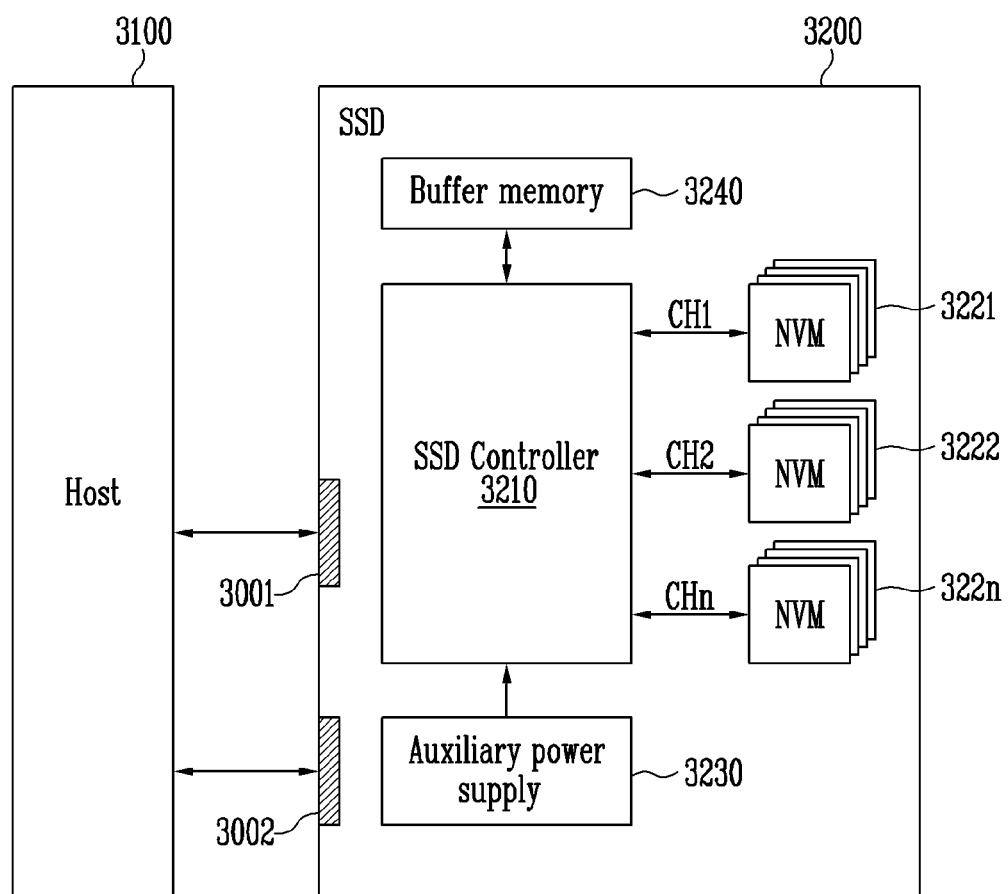
FIG. 11 is a block diagram illustrating a solid state drive (SSD) system to which a storage device according to an embodiment of the present disclosure is applied.

FIG. 11 is a block diagram illustrating a solid state drive (SSD) system 3000 to which a storage device according to an embodiment of the present disclosure is applied.

The SSD system 3000 may include a host 3100 and an SSD 3200. The SSD 3200 may exchange a signal SIG with the host 3100 through a signal connector 3001, and may receive power PWR through a power connector 3002. The SSD 3200 may include an SSD controller 3210, a plurality of flash memories 3221 to 322$n$, an auxiliary power supply 3230, and a buffer memory 3240.

In accordance with an embodiment of the present disclosure, the SSD controller 3210 may perform the function of the memory controller 200, described above with reference to FIG. 1.

The SSD controller 3210 may control the plurality of flash memories 3221 to 322$n$ in response to the signal SIG received from the host 3100. In an embodiment, the signal SIG may indicate signals based on the interfaces of the host 3100 and the SSD 3200. For example, the signal SIG may be a signal defined by at least one of various interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer small interface (SCSI), enhanced small disk interface (ESDI), integrated drive electronics (IDE), firewire, universal flash storage (UFS), WiFi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be located inside the SSD 3200 or located outside the SSD 3200. For example, the auxiliary power supply 3230 may be located in a main board, and may also provide auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322$n$, or may temporarily store meta data (e.g., mapping tables) of the flash memories 3221 to 322$n$. The buffer memory 3240 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 12:
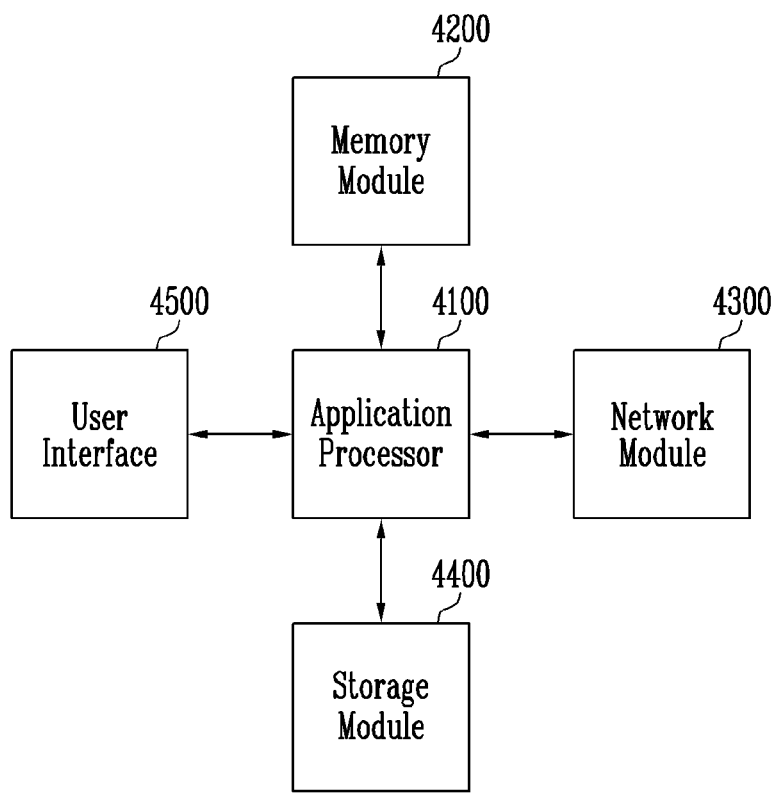
FIG. 12 is a block diagram illustrating a user system to which a storage device according to an embodiment of the present disclosure is applied.

FIG. 12 is a block diagram illustrating a user system 4000 to which a storage device according to an embodiment of the present disclosure is applied.

The user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be formed of a system-on-chip (SoC).

The memory module 4200 may act as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM or nonvolatile RAMs such as PRAM, ReRAM, MRAM, and FRAM. In an embodiment, the application processor 4100 and the memory module 4200 may be packaged based on a package-on-package (POP), and may then be provided as a single semiconductor package.

The network module 4300 may communicate with external devices. In an embodiment, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wimax, WLAN, Ultra-Wideband (UWB), Bluetooth, or WI-FI. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (removable drive), such as a memory card or an external drive of the user system 4000.

In an embodiment, the storage module 4400 may include a plurality of nonvolatile memory devices, each of which may be operated in the same manner as the memory device 100, described above with reference to FIG. 1. The storage module 4400 may be operated in the same manner as the storage device 50, described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a memory controller having improved map caching performance and a method of operating the memory controller.

Hereinafter, other embodiments of the storage device 50 will be described.

Pooled Cache Architecture for Accelerating FTL Process

The disclosure in U.S. patent application Ser. No. 16/997,853, is incorporated herein by reference in its entirety.

In an embodiment, the memory controller 200 of FIG. 1 may include a cache memory having dedicated areas for different types of meta data, as illustrated in FIGS. 7 and 8 of U.S. patent application Ser. No. 16/997,853, which is incorporated herein by reference in its entirety.

Figure 13:
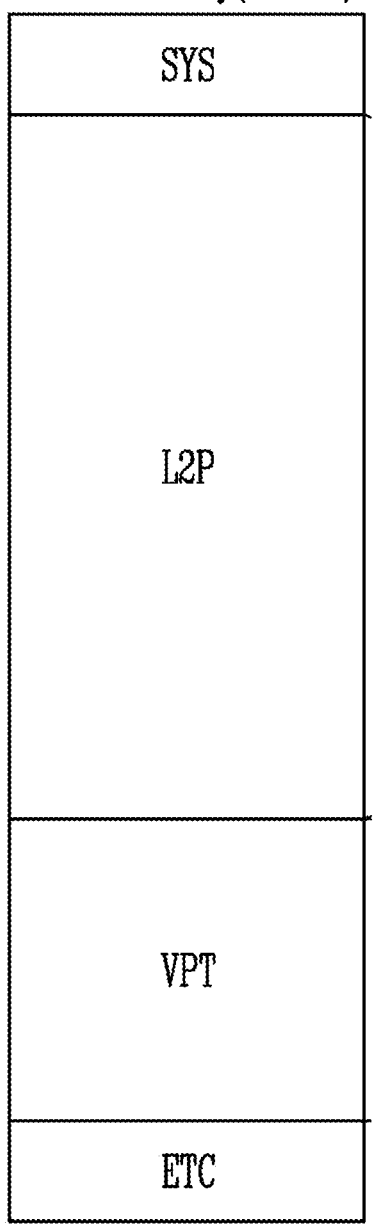
FIG. 13 illustrates a cache memory according to a first embodiment.
Figure 13:
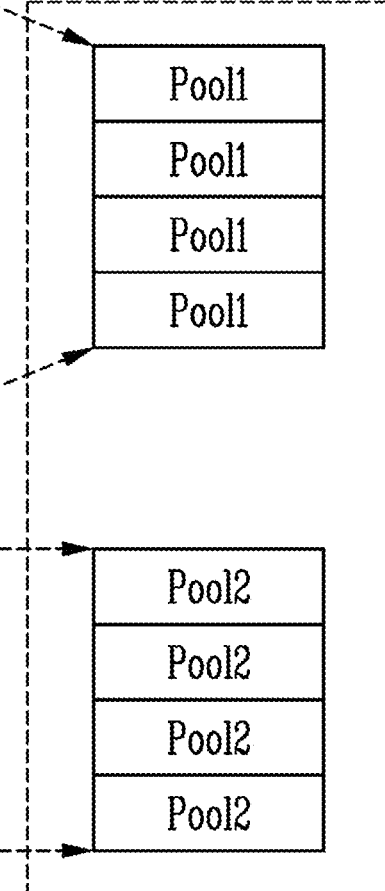

FIG. 13 is a diagram illustrating a cache memory 220-1 that may be included in the cache memory 220 of FIG. 2 according to an embodiment, which is similar to FIG. 7 of U.S. patent application Ser. No. 16/997,853.

Referring to FIG. 13, a buffer memory 210-1 may include meta data such as system data SYS, L2P map data L2P, valid page table (VPT) data VPT, and other meta data ETC. The system data SYS, the L2P map data L2P, the VPT data VPT, and the other meta data ETC may be the meta data described with reference to FIG. 1. For example, the system data SYS may be firmware (FW) data. The other meta data ETC may include bad block data, read count data, cycling data, hot/cold data, journal data indicating the change content of the map data, and the like.

The cache memory 220-1 may include a plurality of dedicated areas. Specifically, the cache memory 220-1 may include a first pool cache area Pool1 and a second pool cache area Pool2. Each pool cache area may be allocated as an area for caching the L2P map data L2P or as an area for caching the VPT data VPT. For example, the L2P map data L2P may be cached only in the first pool cache area Pool1, and the VPT data VPT may be cached only in the second pool cache area Pool2. That is, the first pool cache area Pool1 and the second pool cache area Pool2 may be defined as dedicated areas for caching the L2P map data L2P and the VPT data VPT, respectively.

In an embodiment, another pool cache area (not shown) may be provided in the cache memory 220-1 for caching the system data SYS and/or the other meta data ETC. In another embodiment, the system data SYS and/or the other meta data ETC may be cached in the first pool cache area Pool1 along with the L2P map data L2P, may be cached in the second pool cache area Pool2 along with the L2P map data L2P, or both. In another embodiment, the system data SYS and/or the other meta data ETC may not be cached in the cache memory 220-1.

In an embodiment, a dedicated area of the cache memory 220-1 may operate in a fully associative manner with respect to a corresponding buffer memory area.

In an embodiment, one or more address comparison values (such as an address lower bound value, or address upper bound value, or both) associated with a dedicated area of the cache memory 220-1 may be compared to an address of an access to the buffer memory 210-1 to determine whether the access is to the corresponding buffer memory area for the dedicated area. In an embodiment, the one or more comparison values may be stored in programmable registers. In an embodiment, each dedicated area in the cache memory 220-1 may have respective one or more comparison values. In another embodiment, the buffer memory 210-1 may be conceptually organized as a plurality of same-size regions, and a hardware register having one or more bits respectively associated with each region may indicate which if any of the dedicated area of the cache memory 220-1 may cache that region. For example, given the buffer memory 210-1 has a capacity of 1024 megabytes and the cache memory 220-1 includes first and second dedicated areas, the buffer memory 210-1 may be conceptually organized as 256 16-megabyte regions, and a region map may include two bits for each region, where the two bits for each region may indicate that the region may be one of non-cacheable, cacheable in only the first dedicated area, cacheable in only the second dedicated area, and cacheable in any area. In embodiments, the region map may be stored in a programmable register, and the bits for a region are identified using some number of most significant bits of the address used to access the buffer memory 210-1. However, embodiments are not limited to the illustrative embodiment described above.

In an embodiment, management of the dedicated areas of the cache memory 220-1 may be performed as part of a cache miss handling process of the cache memory 220-1. When a cache miss occurs on an access to the buffer memory 210-1, the dedicated area of the cache memory 220-1 corresponding to the address of the access may be identified (such as by using address comparison values or a region map, as described above), and a cache line from among cache lines associated with the identified dedicated area may be allocated to store the data of the access according to a replacement policy of the cache memory 220-1. However, embodiments are not limited thereto.

According to the embodiment of FIG. 13, a phenomenon in which frequent access to a specific address area causes the cache miss in another address area may be fundamentally prevented. That is, by separating the cache area storing accesses to the L2P map data L2P and the cache area storing accesses to the VPT data VPT, an effect of each access on the cache hit rate may be eliminated, and a maximum cache hit rate in each of the dedicated areas may be expected.

In an embodiment, a size of the first pool cache area Pool1 and the second pool cache area Pool2 may be the same.

Alternatively, the sizes of the first pool cache area Pool1 and the second pool cache area Pool2 may be different. When the sizes of the first pool cache area Pool1 and the second pool cache area Pool2 are different, the sizes of the first pool cache area Pool1 and the second pool cache area Pool2 may be proportional or inversely proportional to the number of accesses of data in the buffer memory 210-1 corresponding to each of the first pool cache area Pool1 and the second pool cache area Pool2. Alternatively, the sizes of the first pool cache area Pool1 and the second pool cache area Pool2 may be proportional or inversely proportional to a size of the data in the buffer memory 210-1 corresponding to each of the first pool cache area Pool1 and the second pool cache area Pool2.

Figure 14:
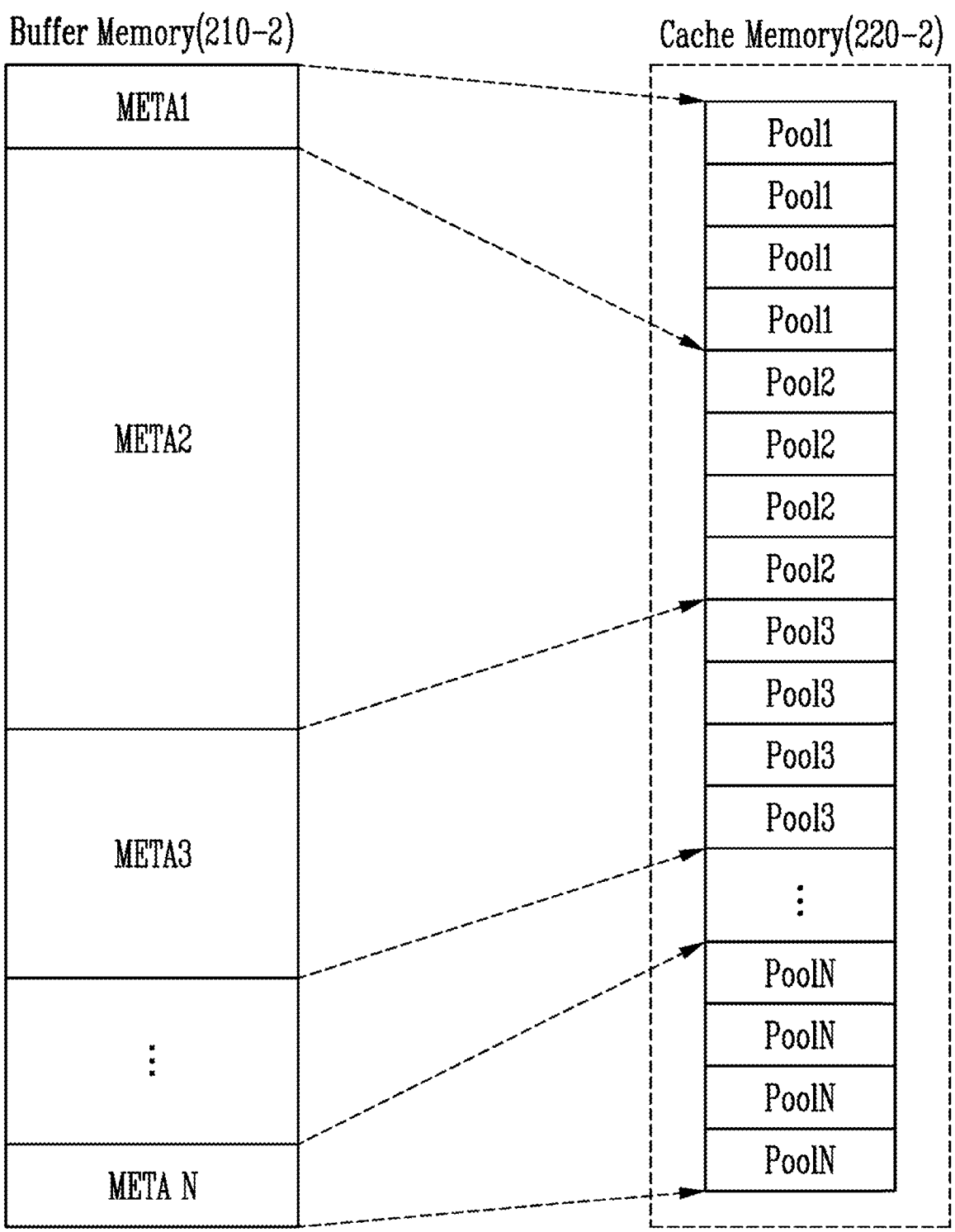
FIG. 14 illustrates a cache memory according to a second embodiment.

FIG. 14 is a diagram illustrating a cache memory 220-2 that may be included in the cache memory 220 of FIG. 2 according to another embodiment, which is similar to FIG. 8 of U.S. patent application Ser. No. 16/997,853.

Referring to FIG. 14, a buffer memory 210-2 may store a plurality of meta data. Specifically, the buffer memory 210-2 may store first meta data META1 to N-th meta data META N.

Here, each of the meta data META1 to META N may respectively be one or more of the bad block data, the firmware data, the map data, the VPT data, the read count data, the cycling data, the hot/cold data, and the map journal data.

Each meta data has a different size of data, and the number of times each meta data is accessed for each operation may be different. Therefore, when each meta data is cached in one cache memory, only cache miss may occur with respect to specific meta data.

The cache memory 220-2 may include a plurality of dedicated areas. Specifically, the cache memory 220-2 may include a first pool cache area Pool1 to an N-th pool cache area PoolN. The first pool cache area Pool1 to the N-th pool cache area PoolN may be dedicated areas respectively corresponding to the first meta data META1 to the N-th meta data META N. That is, the first pool cache area Pooh to the N-th pool cache area PoolN may operate as dedicated cache memories corresponding to addresses in which the first meta data META1 to the N-th meta data META N are stored, respectively. In embodiments, the cache memory 220-2 may determine the dedicated area corresponding to an access to the buffer memory 210-2 using techniques similar to the address comparison values or region map described with respect to the cache memory 220-1 of FIG. 13, and may manage the dedicated areas as part of cache miss handling as described with respect to the cache memory 220-1 of FIG. 13, but embodiments are not limited thereto.

In an embodiment, a size of each of the first pool cache area Pool1 to the N-th pool cache area PoolN may be the same. That is, the size of the first pool cache area Pool1 to the N-th pool cache area PoolN may be equally allocated regardless of sizes of the first meta data META1 to the N-th meta data META N stored in the buffer memory 210-2. However, embodiments are not limited thereto.

Improvement of DRAM Write Efficiency by Transaction Aggregation

The disclosure in U.S. patent application Ser. No. 16/991, 752, is incorporated herein by reference in its entirety.

In an embodiment of the present disclosure, when an ECC engine is used for a buffer memory, a data aggregator is provided to improve a memory efficiency, and a method of improving the memory efficiency is performed, as illustrated in FIGS. 7 to 10 of U.S. patent application Ser. No. 16/991, 752, which is incorporated herein by reference in its entirety.

Figure 15:
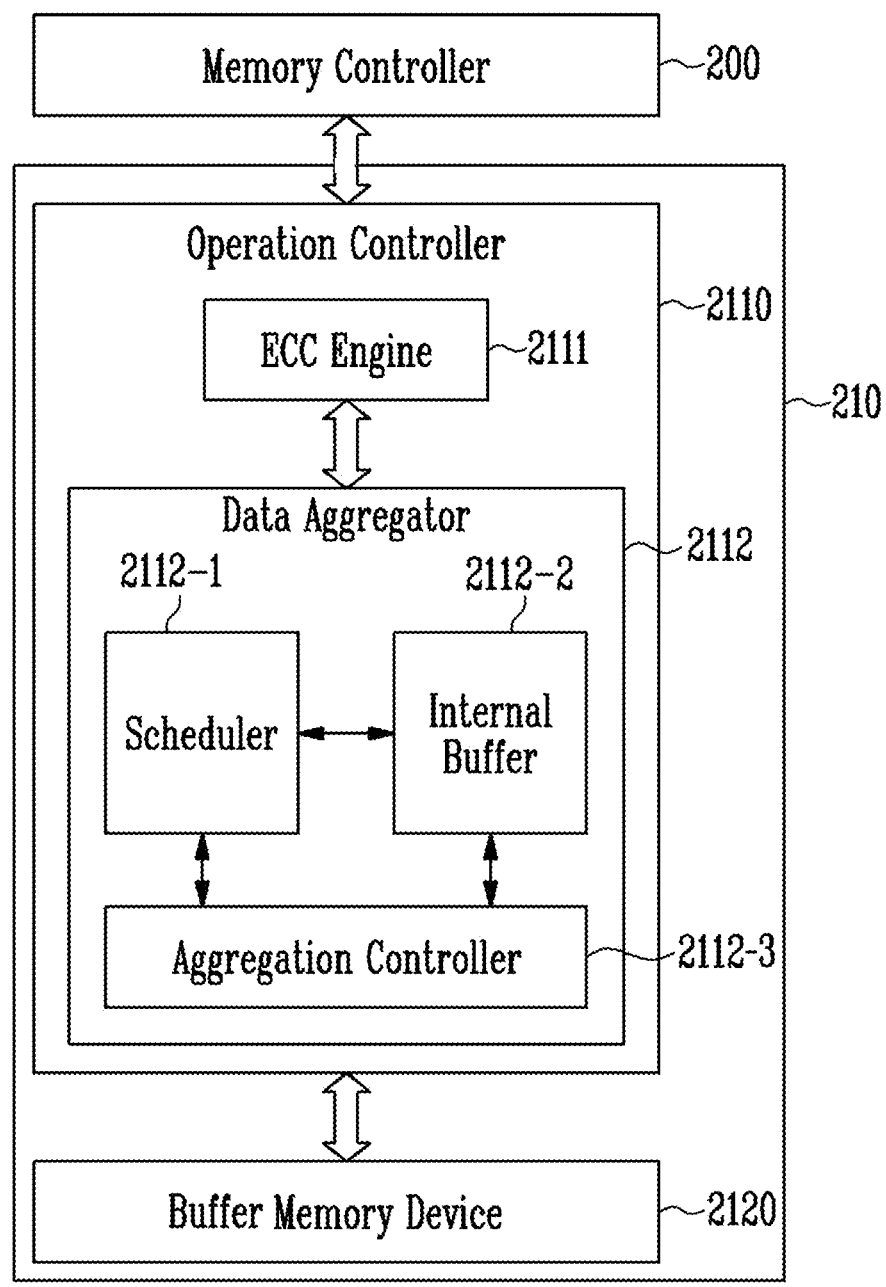
FIG. 15 illustrates a buffer memory according to an embodiment.

FIG. 15 illustrates a buffer memory 210 according to an embodiment of the present disclosure, which is similar to FIG. 7 of U.S. patent application Ser. No. 16/991,752.

Referring to FIG. 15, the buffer memory 210 may include an operation controller 2110 and a buffer memory device 2120.

A memory controller 200 may provide data, which is to be stored in the buffer memory device 2120, to the operation controller 2110.

The operation controller 2110 may include an ECC engine 2111 and a data aggregator 2112.

The data aggregator 2112 may include a scheduler 2112-1, an internal buffer 2112-2, and an aggregation controller 2112-3.

The ECC engine 2111 may generate a codeword obtained by encoding the data to be stored using an error correction code. In an embodiment, the codeword may include message data (e.g., original data) and parity data corresponding to the error correction code. The ECC engine 2111 may provide the codeword to the data aggregator 2112.

The data aggregator 2112 may control the buffer memory device 2120 to perform a write operation of storing data in the buffer memory device 2120 or a read operation of reading data from the buffer memory device 2120. The buffer memory device 2120 may operate using transactions. That is, the data aggregator 2112 may provide a write transaction (e.g., a request to perform a write operation) or a read transaction (e.g., a request to perform a read operation) to the buffer memory device 2120.

The scheduler 2112-1 may operate under the control of the aggregation controller 2112-3. For example, the write transaction provided from the ECC engine 2111 may be stored in a provided sequence under the control of the scheduler 2112-1.

The internal buffer 2112-2 may store the codeword corresponding to the write transaction under the control of the aggregation controller 2112-3.

The aggregation controller 2112-3 may receive the codeword from the ECC engine 2111. The aggregation controller 2112-3 may store the codeword in the internal buffer 2112-2 and provide a write completion response to the ECC engine 2111. The aggregation controller 2112-3 may store the write transaction in the scheduler 112-1. The write transaction may include information on a write address corresponding to the codeword to be stored.

When codewords stored in the internal buffer 2112-2 reach a predetermined size, the aggregation controller 2112-3 may generate a merged transaction, in which the write transactions corresponding to or associated with the stored codewords are merged, and provide the generated merged transaction to the buffer memory device 2120.

Alternatively, when a predetermined number of write transactions are stored in the scheduler 2112-1, the aggregation controller 2112-3 may generate the merged transaction, in which the stored write transactions are merged, and provide the generated merged transaction to the buffer memory device 2120. Addresses corresponding to the write transactions included in the merged transaction may be continuous addresses. In an embodiment, the predetermined size may be a data size corresponding to a burst length of the buffer memory device 2120. Alternatively, the predetermined number of write transactions may be the burst length.

Figure 16:
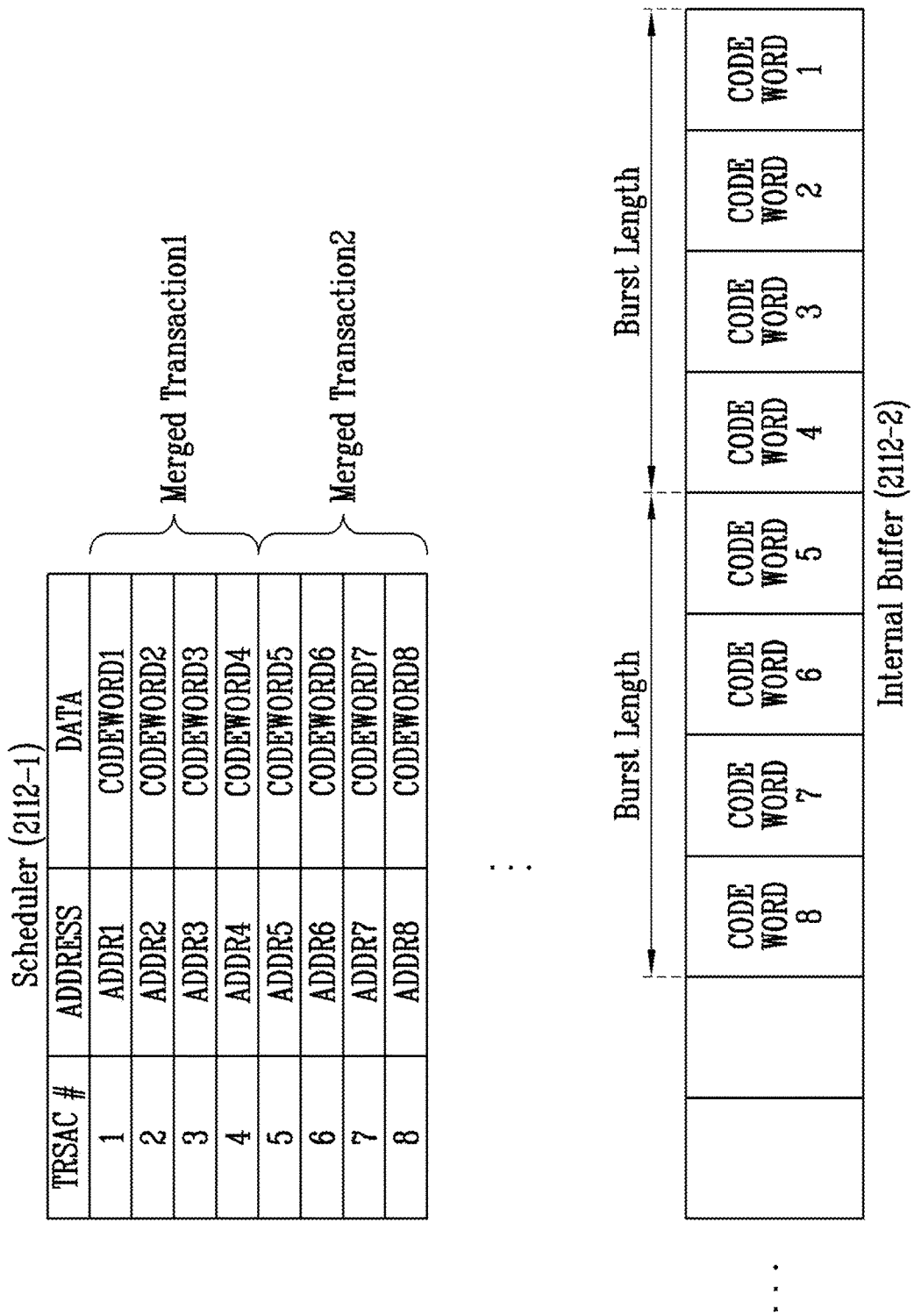
FIG. 16 illustrates an operation of the buffer memory of FIG. 15.

FIG. 16 illustrates an operation of the scheduler 2112-1 and the internal buffer 2112-2 described with reference to FIG. 15, which is similar to FIG. 8 of U.S. patent application Ser. No. 16/991,752.

Referring to FIGS. 15 and 16, the scheduler 2112-1 may store an input write transaction according to or based on an input sequence. In FIG. 16, the burst length is assumed or pre-selected to be four.

In FIG. 16, the scheduler 112-1 stores first to eighth write transactions (e.g., TRSAC). The internal buffer 2112-2 may store a first codeword CODEWORD1 to an eighth codeword CODEWORD8, which respectively correspond to a first write transaction to an eighth write transaction.

A first merged transaction (Merged Transaction1) may include the first to fourth write transactions. A second merged transaction (Merged Transaction2) may include the fifth to eighth write transactions.

Write transactions that may be merged into a merged transaction may have continuous addresses. For example, the first to fourth write transactions have continuous addresses, first address ADDR1 to fourth address ADDR4, respectively, and the fifth to eighth write transactions have continuous addresses, fifth address ADDR5 to eighth address ADDR8, respectively.

Since the burst length of the merged transaction is four, the merged transaction may be generated when four write transactions are stored in the scheduler 2112-1. Alternatively, the merged transaction may receive write transactions for a predetermined time, and then may be generated in a lump.

Because all of the first to eighth write transactions in FIG. 16 are write transactions in which addresses are continuous, a merged transaction that merges any four write transactions may be generated, including merged transactions not shown in FIG. 16. For example, a merged transaction may include the first write transaction, the third write transaction, the fourth write transaction, and the seventh write transaction.

The aggregation controller 2112-3 described with reference to FIG. 15 may provide the merged transaction to the buffer memory device 2120 according to the burst operation.

Figure 17:
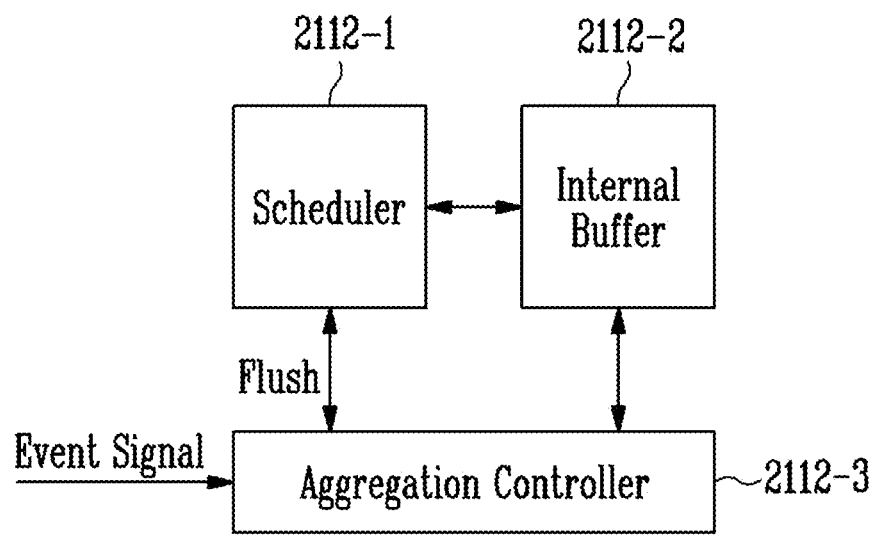
FIG. 17 illustrates an operation of the buffer memory of FIG. 15 when a merged transaction is not generated.

FIG. 17 illustrates an operation of the data aggregator 2112 of FIG. 15 when a merged transaction is not generated, which is similar to FIG. 9 of U.S. patent application Ser. No. 16/991,752.

Referring to FIG. 17, the aggregation controller 2112-3 may control the scheduler 2112-1 and the internal buffer 2112-2 to perform a flush operation of providing the write transaction stored in the scheduler 2112-1 to the buffer memory device 2120 without generating a merged transaction.

For example, the aggregation controller 2112-3 may control the scheduler 2112-1 and the internal buffer 2112-2 to perform the flush operation in response to an event signal generated in the buffer memory 210. Here, the event signal may be generated when the continuity of the addresses of the write transactions is broken, when a read transaction for the same address as the address of the write transaction stored in the scheduler 2112-1 is received, and/or when a forced flush request is received from the memory controller 200. In an embodiment, the forced flush request may be input when an emergency situation occurs, such as a sleep mode that reduces power consumption of the storage device 50 or a sudden power of the storage device 50 off occurs.

Specifically, when the addresses of the write transactions stored in the scheduler 2112-1 are not continuous (e.g., the continuity of the addresses of the write transactions is broken), the aggregation controller 2112-3 may provide each write transaction to the buffer memory device 2120 without generating a merged transaction. For example, when a write transaction having an address that is not continuous with the address of the write transactions stored in the scheduler 2112-1 is provided, the aggregation controller 2112-3 may provide each write transaction to the buffer memory device 2120 without generating a merged transaction.

Alternatively, before generating the merged transaction, when the address for the read transaction is the same address as the address of the write transaction stored in the scheduler 2112-1 is received, in order to avoid a data hazard, the aggregation controller 2112-3 may provide each write transaction to the buffer memory device 2120 without generating a merged transaction. The aggregation controller 2112-3 may provide a read transaction to the buffer memory device 2120 after completion of the write transaction.

Alternatively, the aggregation controller 2112-3 may provide each write transaction to the buffer memory device 2120 without generating a merged transaction in response to a forced flush input, which is input from the outside of the device 50.

In an embodiment, when the write transactions corresponding to the burst length are stored in the scheduler 2112-1, the aggregation controller 2112-3 may generate a merged transaction, provide the merged transaction to the buffer memory device 2120, and then store newly input write transactions in the scheduler 2112-1.

Figure 18:
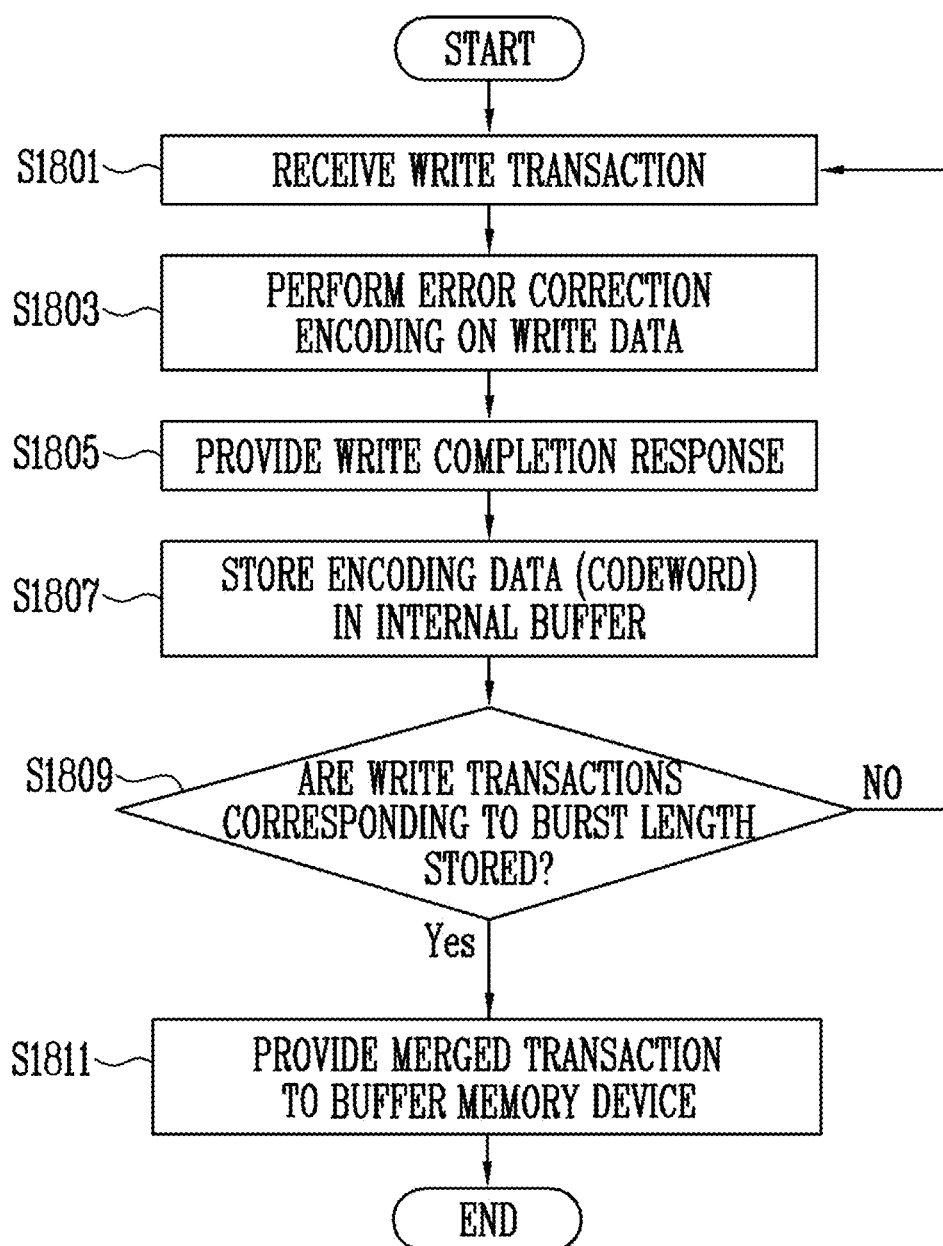
FIG. 18 illustrates an operation of the buffer memory of FIG. 15 according to an embodiment.

FIG. 18 illustrates an operation of the buffer memory 210 included in the storage device 50 according to an embodiment of the present disclosure, which is similar to FIG. 10 of U.S. patent application Ser. No. 16/991,752.

Referring to FIG. 18, in step S1801, the buffer memory 210 may receive a write transaction. The write transaction may be input from any one of the memory controller 200, the memory device 100, and/or the host 300, as described with reference to FIG. 2.

In step S1803, the ECC engine 2111 of the buffer memory 210 may perform error correction encoding on write data, which is data corresponding to or associated with the write transaction.

In step S1805, the data aggregator 2112 of the buffer memory 210 may first provide a write completion response to the memory controller 200 that provides the write transaction through the ECC engine 2111.

In step S1807, the aggregation controller 2112-3 receives a codeword, which is encoded data, from the ECC engine 2111 and stores the codeword in the internal buffer 2112-2.

In step S1809, the aggregation controller 2112-3 may determine whether write transactions corresponding to the burst length are stored in the internal buffer 2112-2. When the write transactions corresponding to the burst length are not stored, the operation returns to step S1801. When the write transactions corresponding to the burst length are stored, the operation proceeds to Step S1811.

In step S1811, the aggregation controller 2112-3 of the buffer memory 210 may generate a merged transaction, in which the write transactions are merged, and provide the merged transaction to the buffer memory device 2120 to store data in the buffer memory device 2120. Here, the write transactions included in the merged transaction may be the write transactions with the continuous addresses.

While various embodiments have been described above, it will be understood to those skilled in the art that the embodiments described are by way of example only. Accordingly, the system and device described herein should not be limited based on the described embodiments.

What is claimed is:

1. A memory controller for controlling a memory device, the memory controller comprising:
    a buffer memory configured to store first meta data and second meta data;
    a cache memory including first and second dedicated areas;
    a host interface controller configured to generate command segments corresponding to a request of a host, cache the first meta data corresponding to a target command segment among the command segments from the buffer memory to the first dedicated area, and provide the target command segment to a memory operation controller; and
    the memory operation controller configured to control an operation of the memory device based on the target command segment, and cache the second meta data corresponding to another command segment to be received after the target command segment among the command segments from the buffer memory to the second dedicated area.

2. The memory controller of claim 1, wherein the first and second dedicated areas have the same storage capacity size.

3. The memory controller of claim 1, wherein the first and second dedicated areas have storage capacity sizes proportional to data sizes of the first meta data and the second meta data, respectively.

4. The memory controller of claim 1, wherein the first and second dedicated areas have storage capacity sizes inversely proportional to data sizes of the first meta data and the second meta data, respectively.

5. The memory controller of claim 1, further comprising:
    a processor configured to request from the buffer memory the first meta data corresponding to a logical address input according to the request of the host and the second meta data of a physical address corresponding to the logical address input according to the request of the host.

6. The memory controller of claim 5, wherein the first and second dedicated areas have storage capacity sizes proportional to a number of times the processor accesses the first meta data and the second meta data, respectively.

7. The memory controller of claim 5, wherein the first and second dedicated areas have storage capacity sizes inversely proportional to a number of times the processor accesses the first meta data and the second meta data, respectively.

8. The memory controller of claim 1, wherein the first meta data includes data chunks having a first data structure, and the second meta data includes data chunks having a second data structure.

9. The memory controller of claim 1, wherein the first meta data corresponds to a data storage capacity larger than a data storage capacity corresponding to the second meta data.

10. The memory controller of claim 1, wherein sizes of the first meta data and the second meta data are in a non-linear relationship with a number of times the first meta data and the second meta data are accessed.

11. A storage device comprising:
    a buffer memory configured to store first to N-th meta data;
    a cache memory including first to N-th dedicated areas respectively corresponding to areas of the buffer memory in which the first to N-th meta data are stored;
    a host interface controller configured to generate command segments corresponding to a request of a host, cache target meta data corresponding to a target command segment among the first to N-th meta data from the buffer memory to a dedicated area corresponding to the target meta data among the first to N-th dedicated areas, and provide the target command segment among the command segments to a memory operation controller; and
    the memory operation controller configured to control an operation of a non-volatile memory based on the target command segment, and cache remaining meta data corresponding to remaining command segments other than the target command segment among the command segments from the buffer memory to remaining dedicated areas other than the dedicated area, respectively,
    wherein a size of the first to N-th dedicated areas is determined according to a number of times each of the first to N-th meta data is accessed by requests from the host.

12. The storage device of claim 11, wherein the sizes of the first to N-th dedicated areas are determined according to a pattern in which the first to N-th meta data are accessed.

13. The storage device of claim 11, wherein the sizes of the first to N-th dedicated areas are determined according to an access probability of each of the first to N-th meta data.

14. The storage device of claim 11, wherein the sizes of the first to N-th dedicated areas are proportional to a number of accesses of each of the first to N-th meta data.

15. The storage device of claim 11, wherein the sizes of the first to N-th dedicated areas are inversely proportional to a number of accesses of each of the first to N-th meta data.

16. The storage device of claim 11, wherein the sizes of the first to N-th dedicated areas are proportional to sizes of the first to N-th meta data, respectively.

17. The storage device of claim 11, wherein the sizes of the first to N-th dedicated areas are inversely proportional to sizes of the first to N-th meta data, respectively.

18. The storage device of claim 11, wherein the buffer memory is a dynamic random access memory.

19. The storage device of claim 11,
    wherein the non-volatile memory is configured to store the first to N-th meta data, and
    wherein the non-volatile memory is a NAND flash memory.

* * * * *